United States Patent
Yoshida et al.

(10) Patent No.: US 10,168,955 B2
(45) Date of Patent: Jan. 1, 2019

(54) INFORMATION PROCESSING DEVICE AND INFORMATION PROCESSING METHOD FOR CONTROLLED EXECUTION OF STORING AND READING OPERATIONS

(71) Applicant: SONY CORPORATION, Tokyo (JP)

(72) Inventors: Kyosuke Yoshida, Kanagawa (JP); Takahiro Araki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/323,191

(22) PCT Filed: Jun. 9, 2015

(86) PCT No.: PCT/JP2015/066593
§ 371 (c)(1),
(2) Date: Dec. 30, 2016

(87) PCT Pub. No.: WO2016/009747
PCT Pub. Date: Jan. 21, 2016

(65) Prior Publication Data
US 2017/0160990 A1    Jun. 8, 2017

(30) Foreign Application Priority Data

Jul. 18, 2014 (JP) .................................. 2014-147346

(51) Int. Cl.
*G06F 13/00* (2006.01)
*G06F 3/06* (2006.01)
(Continued)

(52) U.S. Cl.
CPC ............ *G06F 3/0659* (2013.01); *G06F 3/061* (2013.01); *G06F 3/0689* (2013.01); *G06F 9/4881* (2013.01); *G06F 17/30073* (2013.01)

(58) Field of Classification Search
CPC ...... G06F 3/0659; G06F 3/061; G06F 3/0689; G06F 9/4881; G06F 17/30073
See application file for complete search history.

(56) References Cited

U.S. PATENT DOCUMENTS 6,263,411 B1 * 7/2001 Kamel ............... H04N 21/2182
348/E5.008
7,277,984 B2 * 10/2007 Ghosal .................. G06F 3/0611
710/1

(Continued)

FOREIGN PATENT DOCUMENTS

JP      10-301819 A      11/1998
JP      2001-176247 A    6/2001
(Continued)

*Primary Examiner* — Charles Rones
*Assistant Examiner* — Han V Doan
(74) *Attorney, Agent, or Firm* — Chip Law Group

(57) ABSTRACT

In an information processing device 10, a control unit 50 that performs a job of storing information on a recording medium selected from among a plurality of recording media or a job of reading the information from a recording medium on which desired information is stored among the plurality of recording media by controlling a recording media drive is arranged. The control unit 50 divides a plurality of the jobs into a group performing storage of the information and a group performing reading of the information and performs a setting process of setting an execution sequence of the jobs in order of the groups and, for the job of reading the information, performs a combination process combining jobs of which recording media of transmission sources or transmission destinations of the information are common. Since jobs are executed in order for each group, and, in the group reading information, jobs of which recording media of transmission sources or transmission destinations of information are common are combined, the number of times of (Continued)

replacing a recording medium can be decreased, and accordingly, archiving and retrieval can be efficiently performed.

10 Claims, 19 Drawing Sheets

(51) Int. Cl.
  *G06F 9/48* (2006.01)
  *G06F 17/30* (2006.01)

(56) References Cited

U.S. PATENT DOCUMENTS

| | | | |
|---|---|---|---|
| 8,375,159 B2* | 2/2013 | Hsieh | G06F 3/0616 |
| | | | 711/103 |
| 2012/0023431 A1* | 1/2012 | Roth | G06F 3/0488 |
| | | | 715/772 |
| 2012/0047316 A1* | 2/2012 | Post | G06F 3/0608 |
| | | | 711/170 |
| 2013/0297852 A1* | 11/2013 | Fai | G11C 16/12 |
| | | | 711/103 |
| 2014/0122793 A1* | 5/2014 | Inoue | G06F 3/0676 |
| | | | 711/112 |

FOREIGN PATENT DOCUMENTS

| | | |
|---|---|---|
| JP | 2001-307420 A | 11/2001 |
| JP | 2004-304488 A | 10/2004 |
| JP | 2004-356751 A | 12/2004 |
| JP | 2005-149598 A | 6/2005 |
| JP | 2008-182401 A | 8/2008 |

\* cited by examiner

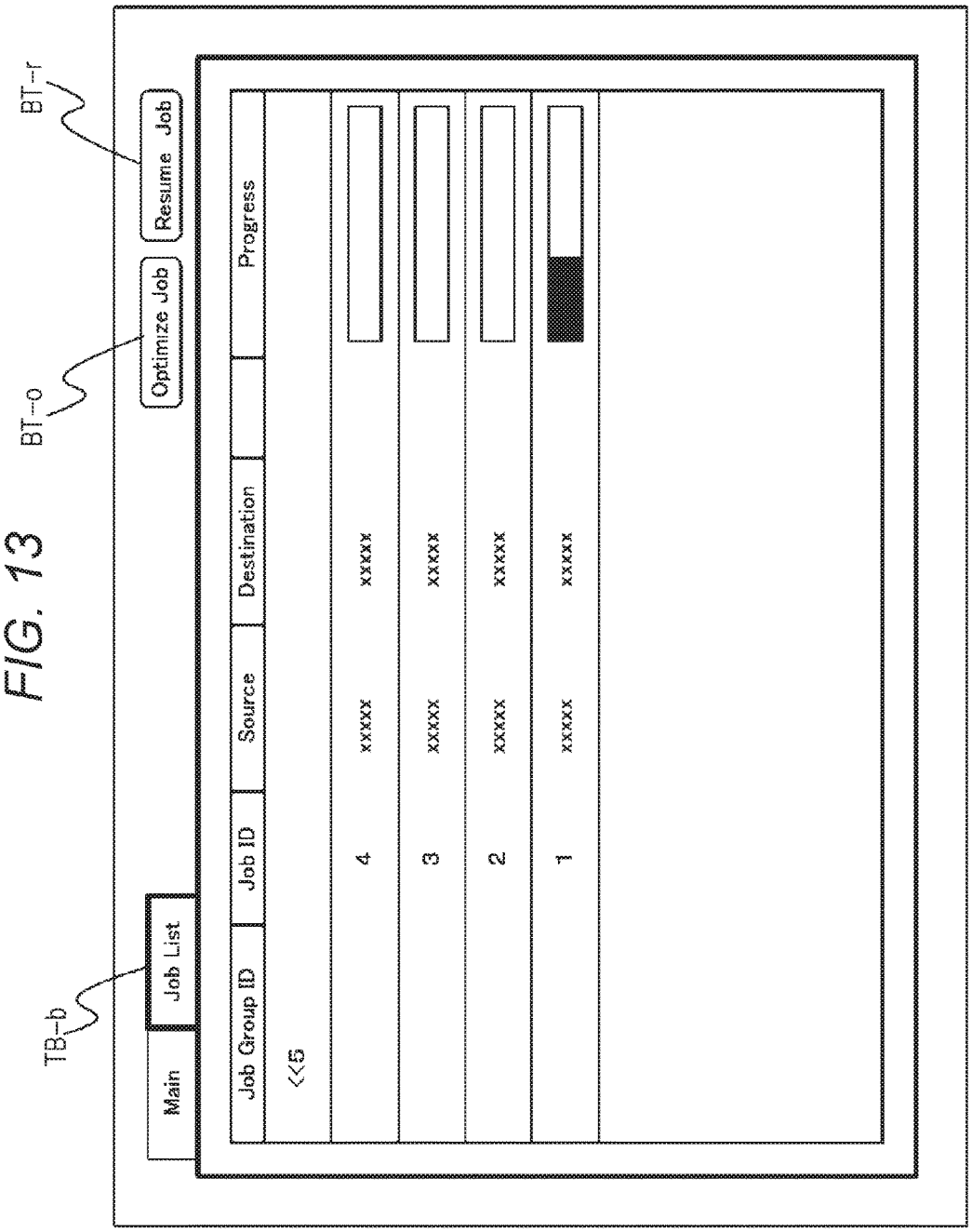

INFORMATION PROCESSING DEVICE AND INFORMATION PROCESSING METHOD FOR CONTROLLED EXECUTION OF STORING AND READING OPERATIONS

CROSS REFERENCE TO RELATED APPLICATIONS

This application is a U.S. National Phase of International Patent Application No. PCT/JP2015/066593 filed on Jun. 9, 2015, which claims priority benefit of Japanese Patent Application No. JP 2014-147346 filed in the Japan Patent Office on Jul. 18, 2014. Each of the above-referenced applications is hereby incorporated herein by reference in its entirety.

TECHNICAL FIELD

The present technology relates to an information processing device, an information processing method, and a program and enables archiving and retrieval to be efficiently performed.

BACKGROUND ART

In conventional information processing devices, in a case where information to be reproduced is scattered in fragments on a recording medium, the reading order of data that is scattered on the recording medium is changed, and data read in the changed order is output in the original reproduction order by using a memory. By performing such a process, data accesses are efficiently performed. For example, in Patent Document 1, it is determined whether to change the reading order of data recorded on a disk on the basis of a write time for a memory, a seeking time, and a read start time from the memory. Here, when the reading order is changed, data read in the changed order from the disk is stored in the memory, and the data is output in the original output order from this memory.

CITATION LIST

Patent Document

Patent Document 1: Japanese Patent Application Laid-Open No. 2001-176247

SUMMARY OF THE INVENTION

Problems to be Solved by the Invention

Meanwhile, in the information processing devices, information is archived or retrieved by using a plurality of recording media. Here, for example, in archiving information, in a case where information is continuously recorded in order from the start of a recording medium, recorded information is not scattered in fragments on the recording medium. Accordingly, even in a case where the process disclosed in Patent Document 1 is used, archiving or retrieval cannot be efficiently performed.

Thus, an object of the present technology is to provide an information processing device, an information processing method, and a program capable of efficiently performing archiving and retrieval of information by using a plurality of recording media.

Solutions to Problems

A first aspect of the present technology lies in an information processing device including:

a control unit that performs a job of storing information on a recording medium selected from among a plurality of recording media or a job of reading the information from a recording medium on which desired information is stored among the plurality of recording media by controlling a recording media drive, wherein the control unit divides a plurality of the jobs into a group performing storage of the information and a group performing reading of the information and performs a setting process of setting an execution sequence of the jobs in order of the groups and, for the job of reading the information, performs a combination process combining jobs of which recording media of transmission sources or transmission destinations of the information are common.

According to the present technology, a control unit that performs a job of storing one or a plurality of pieces of information on a recording medium selected from among a plurality of recording media or a job of reading desired one or a plurality of pieces of information from a recording medium on which desired information is stored among the plurality of recording media by controlling a recording media drive is arranged. In the storing of the information on a recording medium, information is sequentially stored on a recording medium and, in a case where the information cannot be stored, the information is sequentially stored on a new recording medium. The control unit divides a plurality of the jobs into a group performing storage of the information and a group performing reading of the stored information and performs a setting process of setting an execution sequence of the jobs in order of the groups and, in a case where a job of storing the information is added, sets the job as a job executed last in the group performing storage of the information. In addition, in a case jobs of which recording media of transmission sources or transmission destinations of information are common are generated in the group performing reading of the information, the control unit performs the combination process of combining the jobs of which the recording media of the transmission sources or the transmission destinations of information are common.

In addition, in a case where there is a plurality of the recording media drives, the control unit performs the setting process of setting the execution sequence and the combination process for each of the recording media drives and performs jobs in order of the recording media drives. In addition, the control unit prepares a recording medium used in a job that is subsequently executed in a recording media drive other than a currently-used recording media drive in the middle of execution of a job. Furthermore, the control unit performs display control of a management screen representing a storage state of the information and, in a case where an operation for storing information on the recording medium or reading information stored on the recording medium is performed on the management screen, registers a job according to the operation. In addition, the control unit performs display control of a list screen representing a list of the jobs, performs the setting process of setting the execution sequence and the combination process in accordance with a direction on the list screen, and displays a process result on the list screen. On the list screen the jobs are displayed to be aligned in an execution sequence, the execution sequence is changed in accordance with an operation of moving a job on the list screen.

A second aspect of the present technology lies in an information processing method using a control unit that performs a job of storing information on a recording medium selected from among a plurality of recording media or a job of reading the information from a recording medium on which desired information is stored among the plurality of recording media by controlling a recording media drive,
the control unit including:
dividing a plurality of the jobs into a group performing storage of the information and a group performing reading of the information;
performing a setting process of setting an execution sequence of the jobs in order of the groups; and
performing a combination process combining jobs of which recording media of transmission sources or transmission destinations of the information are common for the job of reading the information.

A third aspect of the present technology lies in a program causing a computer to execute a job of storing information on a recording medium selected from among a plurality of recording media or a job of reading the information from a recording medium on which desired information is stored among the plurality of recording media by controlling a recording media drive, the program causing the computer to execute:
dividing a plurality of the jobs into a group performing storage of the information and a group performing reading of the information;
performing a setting process of setting an execution sequence of the jobs in order of the groups; and
performing a combination process combining jobs of which recording media of transmission sources or transmission destinations of the information are common for the job of reading the information.

Incidentally, a program of the present technology is a program that can be provided by a storage medium provided in a computer-readable form or a communication medium, for example, a storage medium such as an optical disc, a magnetic disk, or a semiconductor memory or a communication medium such as a network, for example, for a general computer capable of executing various program codes. By providing such a program in the computer-readable form, a process according to the program is realized on the computer.

Effects of the Invention

According to the present technology, in a case where a job of storing information on a recording medium selected from among a plurality of recording media or a job of reading the information from a recording medium on which desired information is stored among the plurality of recording media is performed by controlling a recording media drive, a plurality of the jobs are divided into a group performing storage of the information and a group performing reading of the information, a setting process of setting an execution sequence of the jobs is performed in order of the groups, and, for the job of reading the information, a combination process combining jobs of which recording media of transmission sources or transmission destinations of the information are common is performed. Accordingly, archiving and retrieval of information can be efficiently performed using a plurality of recording media. Incidentally, the effects described in this specification are merely examples, and the effects of the present technology are not limited thereto, but there may be additional effects.

BRIEF DESCRIPTION OF DRAWINGS

FIG. 13 is a diagram that illustrates a list screen on which jobs included in a job group are expanded to be displayed as an example.

MODE FOR CARRYING OUT THE INVENTION

Hereinafter, embodiments of the present technology will be described. Incidentally, the description will be presented in the following order.
1. Configuration of Information Processing Device
2. Operation of Information Processing Device
2.1 Operation Performed in Case of Single Drive
2.2 Operation Performed in Case of Plurality of Drives
<1. Configuration of Information Processing Device>

Figure 1:
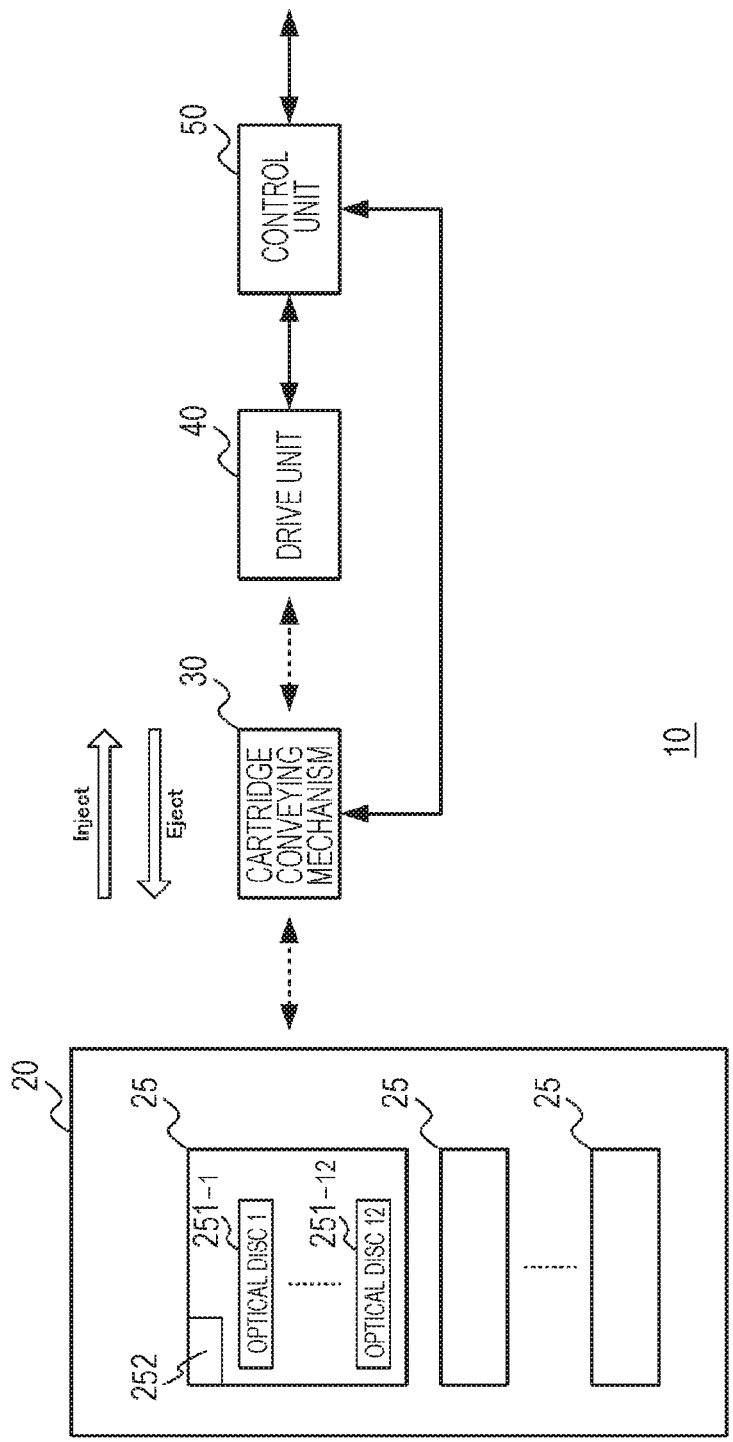
FIG. 1 is a diagram that illustrates the schematic configuration of an information processing device as an example.

FIG. 1 illustrates the schematic configuration of an information processing device according to the present technology as an example. An information processing device 10 includes a cartridge housing unit 20, a cartridge conveying mechanism 30, a drive unit 40, and a control unit 50. Incidentally, in description presented below, a case will be described as an example in which information stored on a recording medium, for example, by using an optical disc as the recording medium is data of a video, an audio, or the like.

The cartridge housing unit 20 is configured to house a plurality of cartridges 25. In a cartridge 25, a plurality of recording media, for example, 12 optical discs 251-1 to 251-12 are housed. In the cartridge 25, for example, data is recorded in order from the optical disc 251-1, and, in a case where data cannot be recorded due to the absence of a vacant area of the optical disc, data is recorded over a next optical disc. In other words, in the cartridge 25, data is sequentially recorded using the optical discs 251-1 to 251-12 in order. In addition, the optical discs 251-1 to 251-12 of the cartridge 25 are handled as one volume and are recognized as one volume from application software of the control unit 50.

In the cartridge 25, a cartridge memory 252 into/from which management information or the like can be written/read in a non-contact system is disposed. In the cartridge memory 252, the management information used for efficiently managing the cartridge 25, recorded data and the like are stored. For example, in the cartridge memory 252, disc information representing the kinds of optical discs 251-1 to 251-12 housed in the cartridge 25 and an optical disc on which data is recorded at last, file system information relating to a recorded file, and the like are stored.

The cartridge conveying mechanism 30 performs a process of extracting a desired cartridge from the cartridge housing unit 20 and conveying the cartridge to the drive unit 40 on the basis of a control signal from the control unit 50. In addition, the cartridge conveying mechanism 30 performs a process of housing the cartridge discharged from the drive unit 40 at the original position in the cartridge housing unit 20. Furthermore, the cartridge conveying mechanism 30, on the basis of a control signal supplied from the control unit 50, performs a process of conveying a cartridge 25 supplied from the outside to the cartridge housing unit 20 or a process of conveying a cartridge housed in the cartridge housing unit 20 to the outside.

The drive unit 40 performs a process of taking in a cartridge 25 conveyed from the cartridge conveying mechanism 30 up to a predetermined position. In addition, the drive unit 40, on the basis of a control signal supplied from the control unit 50, performs a process of extracting an optical disc on which desired data is recorded from the cartridge 25 and a data writing process or a data reading data for the extracted optical disc using an optical drive (hereinafter, simply referred to as a "drive"). Furthermore, the drive unit 40 performs a process of returning an optical disc for which data reading has been completed to the cartridge 25 and a process of discharging a cartridge 25 of which the use has been completed from a predetermined position.

Figure 2:
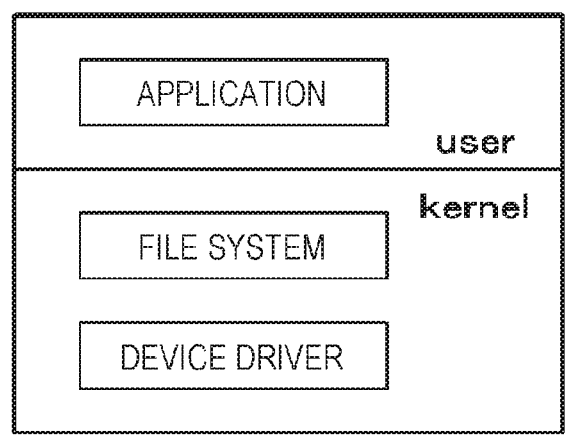
FIG. 2 is a diagram that illustrates software configuring an operating system as an example.

The control unit 50 performs archiving or retrieval by controlling the cartridge conveying mechanism 30 and the drive unit 40. In addition, the control unit 50, in archiving or retrieval, performs grouping of processes, merging of processes, changing of a priority of processes, and the like, thereby enabling archiving and retrieval of data to be efficiently performed. In the control unit 50, as software configuring an operating system, various kinds of application software, a file system, and the like are disposed. FIG. 2 illustrates software configuring an operating system as an example. The software configuring the operating system is divided into a user mode layer and a kernel mode layer. In the user mode layer, application software, for example, a filer used for performing a file operation is arranged. The filer registers a job group of archiving or retrieval on the basis of a direction from a user or the like and processes jobs in order of job groups. Further, in the kernel mode layer, a file system and a device driver such as an optical disc file system, an optical disc device driver and the like are arranged. The file system and the device driver perform drive control of the cartridge conveying mechanism 30 and the drive unit 40 on the basis of a direction from an application and perform data writing or data reading for an optical disc. Incidentally, the software illustrated in FIG. 2 is a part of the operating system, and, in the user mode layer and the kernel mode layer, software that is necessary for performing various operations is arranged.

Incidentally, a job group, for example, is a processing unit in which a file (or a folder) directed according to one drag & drop operation is transmitted. In addition, a job is transmission of files arranged inside a job group, in other words, transmission of one or a plurality of files or folders directed by a user or the like.

<2. Operation of Information Processing Device>

The control unit of the information processing device performs an automatic optimization process in a case where archiving or retrieval is performed. The control unit performs a process of dividing a plurality of job groups into groups of archiving or groups of retrieval, a process of setting the execution sequence of the job groups in order of groups, and a combination process of combining job groups of which optical discs of transmission sources or transmission destination of data are common for the job groups of the retrieval as the automatic optimization process, thereby enabling archiving and retrieval to be efficiently performed by reducing the replacement of optical discs. In addition, the controls unit enables the priority of an arbitrary job group to be manually changed for a job group of the automatic optimization process.

[2-1. Operation Performed in Case of Single Drive]

Figure 3:
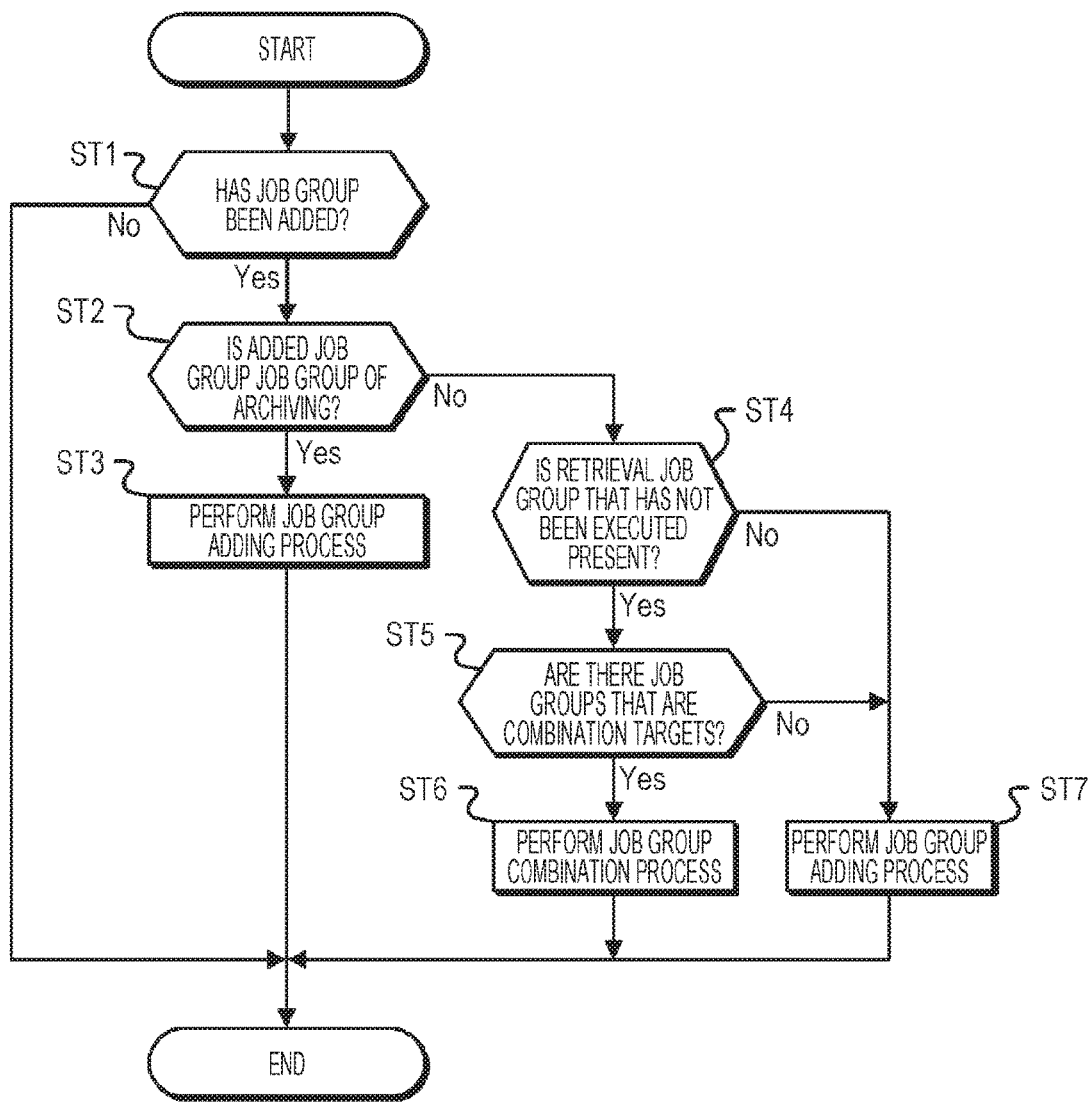
FIG. 3 is a flowchart that illustrates an automatic optimization process performed in a case where there is one drive.

FIG. 3 is a flowchart that illustrates an automatic optimization process performed in a case where there is one drive (optical disc drive) disposed in the drive unit 40. Incidentally, FIG. 3 illustrates a case where a process of setting the execution sequence and, in a case where there are job groups of which optical discs of transmission sources or transmission destinations are common, a combination process are performed in accordance with addition of a job group.

In Step ST1, the control unit 50 determines whether or not a job group is added. The control unit 50 proceeds to Step ST2 in a case where a job group is added, and ends the automatic optimization process in a case where there is no addition of a job group.

In Step ST2, the control unit 50 determines whether the added job group is archiving. The control unit 50 proceeds to Step ST3 in a case where the added job group is archiving and proceeds to Step ST4 in a case where the added job group is retrieval.

In Step ST3, the control unit 50 performs a job group adding process. The control unit 50 adds the added job group to the end of the group of the archiving and ends the automatic optimization process.

When the process proceeds from Step ST2 to Step ST4, the control unit 50 determines whether a retrieval job group that has not been executed is present. The control unit 50 proceeds to Step ST5 in a case where a retrieval job group that has not been executed is present and proceeds to Step ST7 in a case where any retrieval job group that has not been executed is not present.

In Step ST5, the control unit 50 determines whether there are job groups that are combination targets. The control unit 50 determines whether files to be retrieved are present in a same disc and sets retrieval job groups for files present in the same disc as combination targets. The control unit 50 proceeds to Step ST6 in a case where there are job groups that are combination targets and proceeds to Step ST7 in a case where job groups that are combination targets are not present.

In Step ST6, the control unit 50 performs a combination process for the job groups. The control unit 50 reduces the number of times of replacing discs by combining the job groups for files present inside the same disc to be continuous and ends the automatic optimization process.

In Step ST7, the control unit 50 performs a job group adding process. The control unit 50 adds the added job group to the end of the retrieval group and ends the automatic optimization process.

Figure 4:
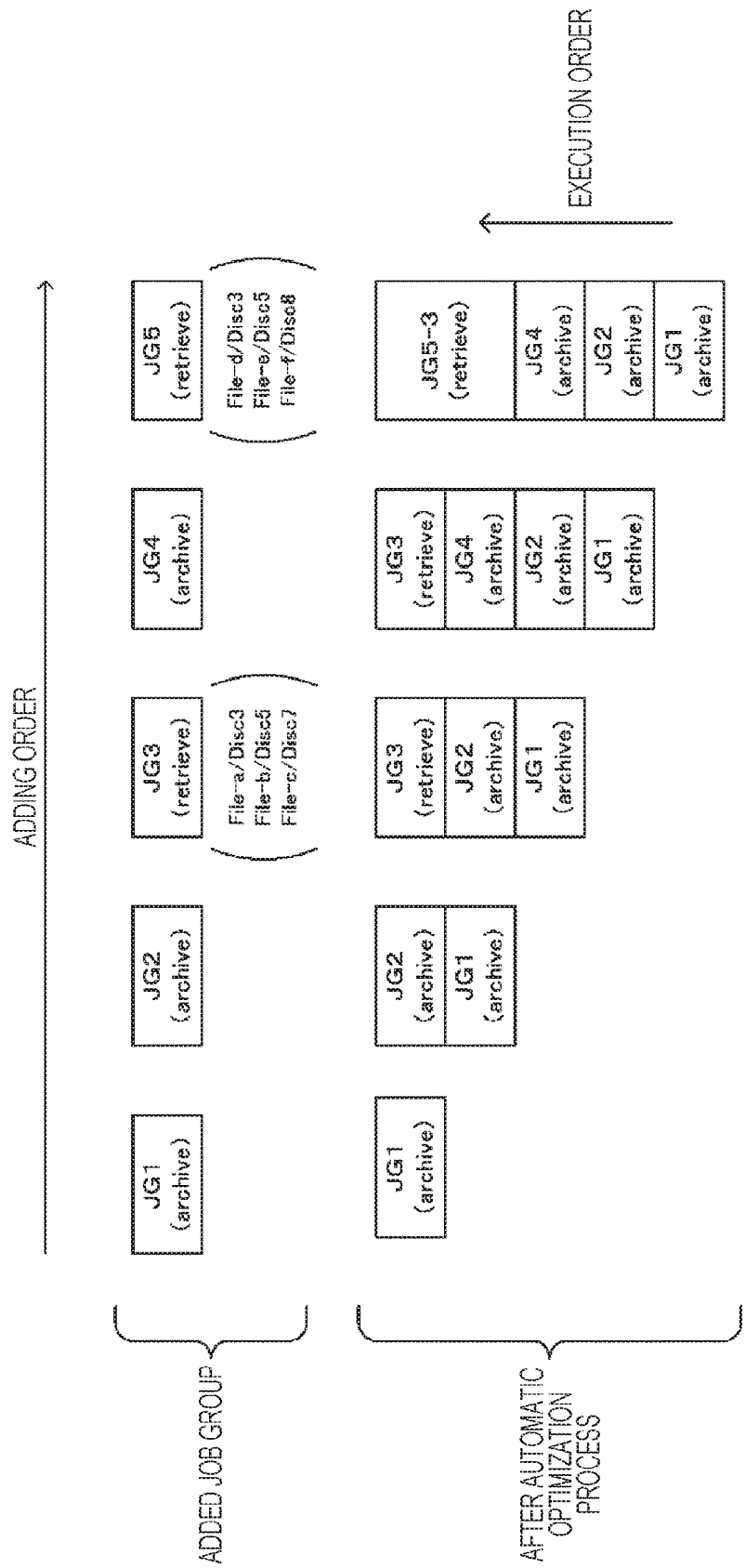
FIG. 4 is a diagram that illustrates an automatic optimization process at the time of adding a job group as an example.

FIG. 4 illustrates an automatic optimization process at the time of adding a job group as an example. When a job group JG2 of archiving is added following a job group JG1 of the archiving, the added job group is the archiving, and thus, the job group JG2 is added to the end of the job groups of the archiving.

When a job group JG3 of retrieval is added, any retrieval job group that has not been executed is not present, and thus, the job group JG3 is added to the end of job groups of the retrieval. Incidentally, FIG. 4 illustrates a case as an example in which a job group of retrieval is executed after a job group of archiving. Further, the job group JG3, for example, is a job group that executes retrieval of a file 1 of a disc 3, a file 2 of a disc 5, and a file 3 of a disc 7.

When a job group JG4 of archiving is added, the added job group is archiving, and thus, the job group JG4 is added after the last job group JG2 of the job groups of archiving.

When a job group JG5 of retrieval is added, a retrieval job group that has not been executed is present, and thus, it is determined whether there are job groups that are combination targets. Here, in a case where the job group JG5, for example, is a job group that executes retrieval of a file 4 of a disc 4, a file 5 of a disc 5, and a file 6 of a disc 8, the disc 5 is commonly used by the job group JG3 and the job group JG5. Accordingly, it is determined that there are job groups that are combination targets, and the job group JG3 and the job group JG5 are combined, and the job groups JG3 and JG5 are updated with a job group JG5-3.

Figure 5B:
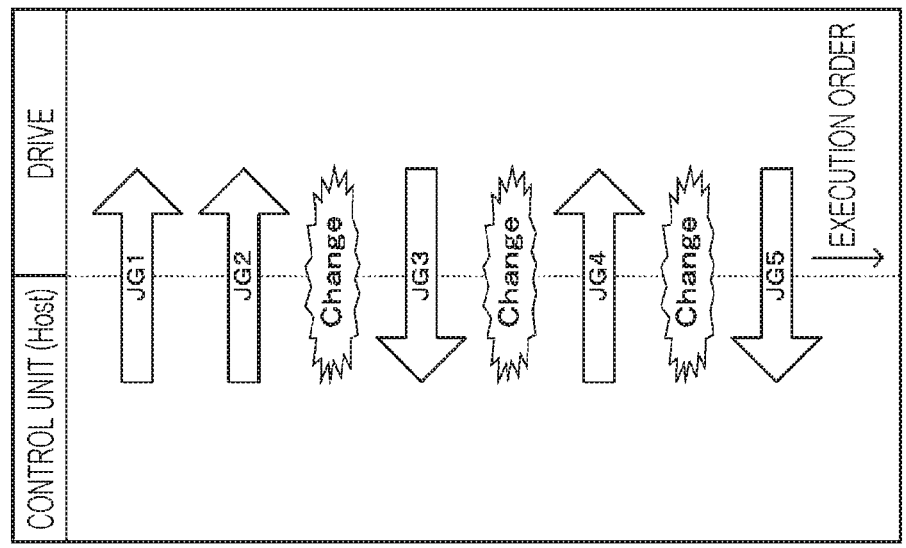
FIGS. 5A and 5B are a diagram that illustrates processing operations of job groups as an example.
Figure 5A:
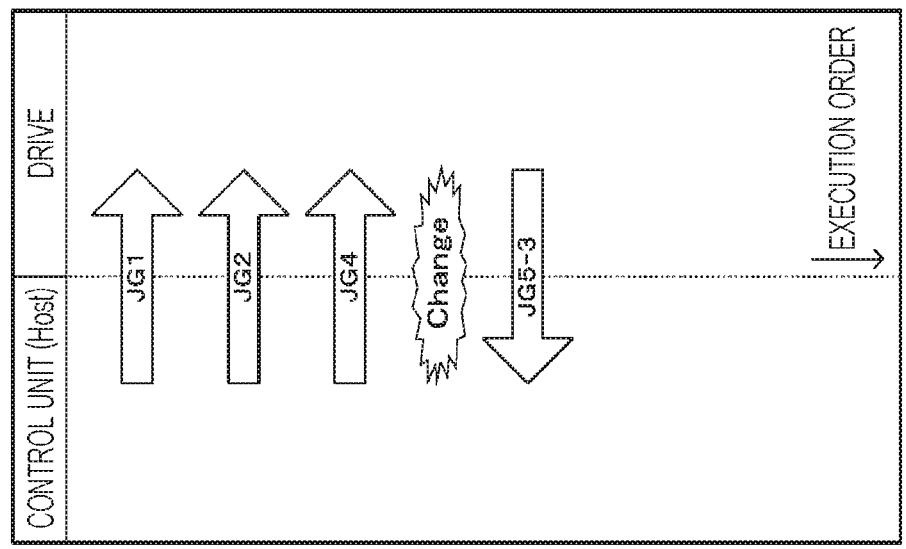

FIGS. 5A and 5B illustrates processing operations of job groups as an example. FIG. 5A illustrates a case where an automatic optimization process is performed, and FIG. 5B illustrates a case where an automatic optimization process is not performed. In a case where the automatic process is performed, job groups of archiving and job groups of retrieval are divided into groups, and, after the job groups JG1, JG2, and JG4 are executed, the job group JG5-3 is executed. In contrast to this, in a case where the automatic optimization process is not performed, after the job groups JG1 and JG2 are executed, the job group JG3 is executed, and thereafter, the job group JG4 is executed.

In a job of archiving, a new file is recorded following a file that has been recorded last, and, in a case where the file is recorded up to the end of an optical disc, disc replacement is performed. Accordingly, in a case where the job groups JG1, JG2, and JG4 are configured to be continuous through the automatic optimization process, the number of times of disc replacement is the smallest. In contrast to this, in a case where the automatic optimization process is not performed, since the job group JG3 is present between the job group JG2 and the job group JG4, in a case where discs used by the job group JG2 and the job group JG3 are different from each other, disc replacement occurs. In addition, in a job of archiving, since a new file is recorded following a file that has been recorded last, in a case where a disc used by the job group JG3 is different from a disc of the job group JG2, disc replacement occurs before the execution of the job group JG4. Furthermore, in a case where the automatic optimization process is not performed, job groups of archiving and job groups of retrieval are not divided into groups. Accordingly, since the job group JG5 of retrieval is present after the job group JG4 of archiving, in a case where a disc used by the job group JG5 is different from a disc of the job group JG4, disc replacement occurs. In other words, by performing the automatic optimization process, the number of times of disc replacement can be decreased to be less than that of a case where the automatic optimization process is not performed.

Figure 6B:
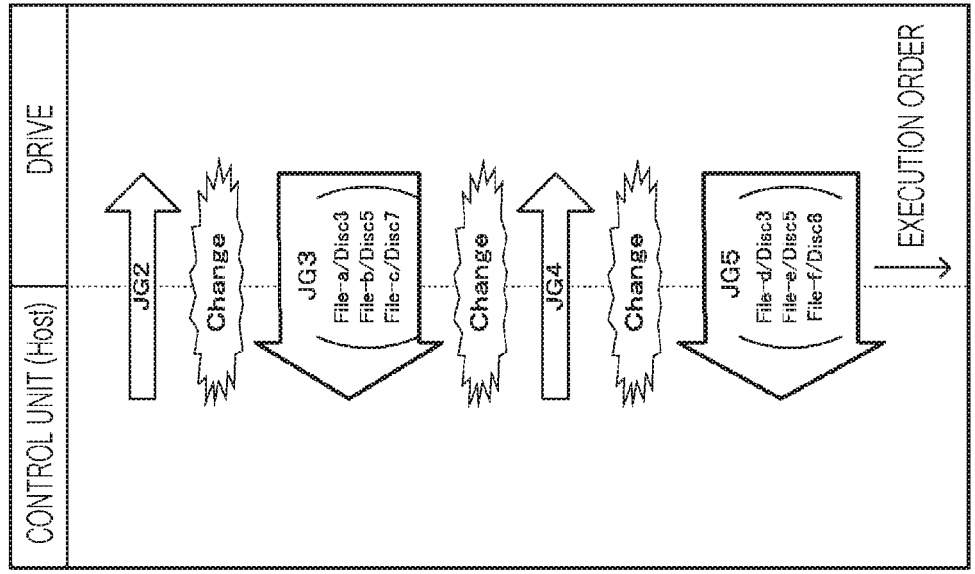
FIGS. 6A and 6B are a diagram that illustrates a combination process of job groups of retrieval as an example.
Figure 6A:
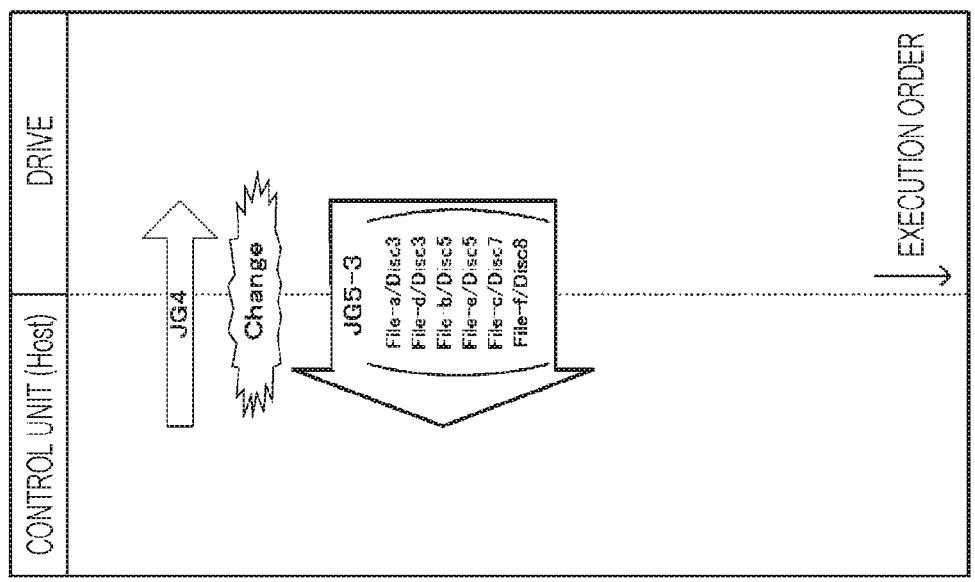

FIGS. 6A and 6B illustrates a combination process of job groups of retrieval as an example. FIG. 6A illustrates a case where the automatic optimization process is performed, and FIG. 6B illustrates a case where the automatic optimization process is not performed.

In a case where the job group JG3 and the job group JG5 of retrieval are combined by the automatic optimization process, in the job group JG5-3, four times of disc replacement including disc replacement at the time of starting a job occurs until the end of the job. In contrast to this, in a case where the automatic optimization process is not performed, in the job group JG3, three times of disc replacement including disc replacement at the time of starting a job occurs until the end of the job. In the job group JG5, three times of disc replacement including disc replacement at the time of starting a job occurs until the end of the job. In this way, in a case where the automatic optimization process is not performed, there are six times of disc replacement in the retrieval. However, in a case where the automatic optimization process is performed, the number of times of disc replacement can be decreased to four times.

Figure 7B:
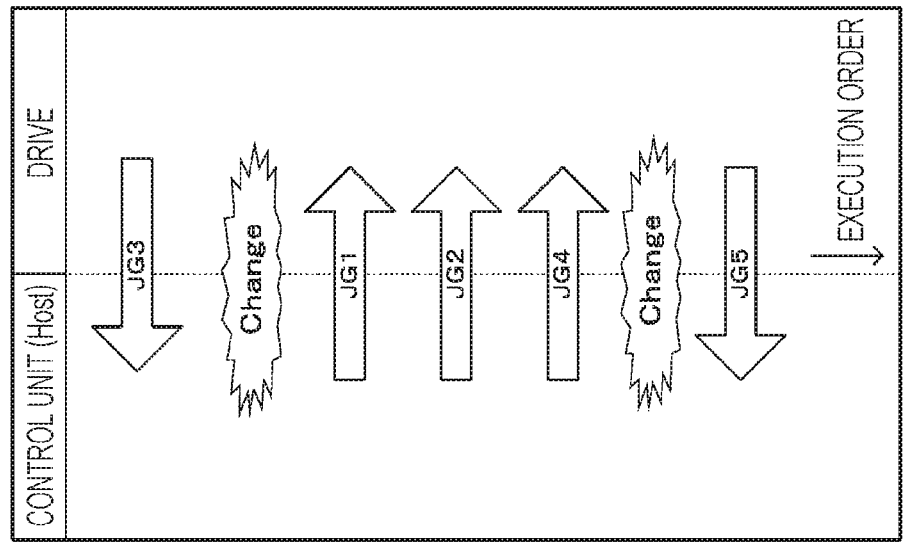
FIGS. 7A and 7B are a diagram that illustrates changing of the priority sequence of job groups as an example.
Figure 7A:
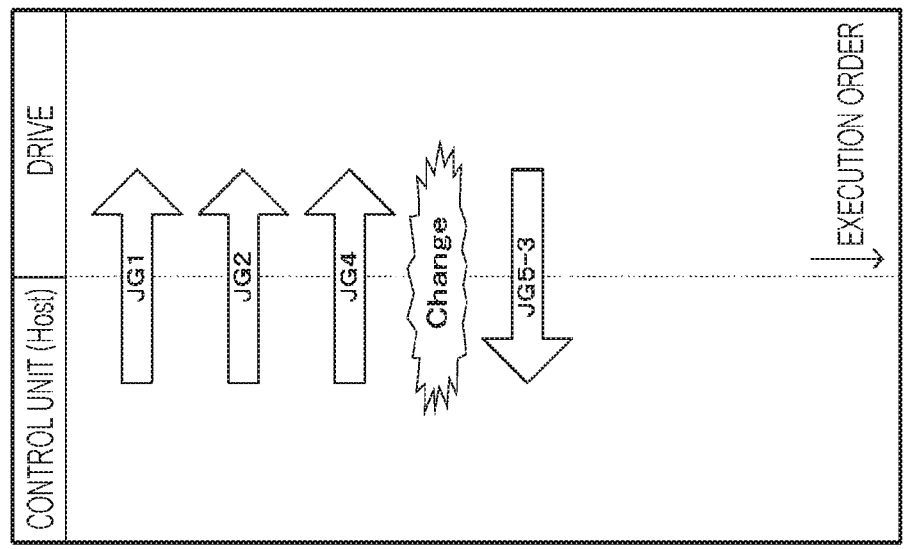

In addition, the control unit 50 may be configured to be able to change the priority sequence of job groups on the basis of a direction from a user or the like. FIGS. 7A and 7B illustrates changing of a priority sequence of job groups as an example. Incidentally, FIG. 7A illustrates a priority sequence after the automatic optimization process, and FIG. 7B illustrates a priority sequence after the change.

As described above, by performing the automatic optimization process, for example, as illustrated in FIG. 7A, the priority sequence is determined in order of a job group JG5-3, which is a job group after the combination process of retrieval, after job groups JG1, JG2, and JG4 of archiving. Here, the control unit 50 changes the priority sequence of job groups on the basis of a direction from a user or the like. For example, in a case where a job group JG3 of retrieval is directed to be executed with the highest priority, the control unit 50 returns the job group JG5-3 to the job groups JG3 and JG5 before the combination and sets the priority sequence such that the job group JG3 is executed first. In this case, even in a case where the automatic optimization process is performed, a desired job group can be executed with priority.

In addition, while the case has been illustrated in FIGS. 3 and 4 in which the setting of the execution sequence or the combination process is performed every time when a job group is added, after registration of a plurality of job groups, the setting of the execution sequence or the combination process may be performed.

FIGS. 8 to 14 illustrate operation screens relating to job groups. Incidentally, the job groups illustrated in FIGS. 8 to 14 are job groups different from the job groups illustrated in FIG. 4. In addition, a case is illustrated in which the setting of the execution sequence and the combination process are performed after registration of a plurality of job groups in accordance with a user's direction.

Figure 8:
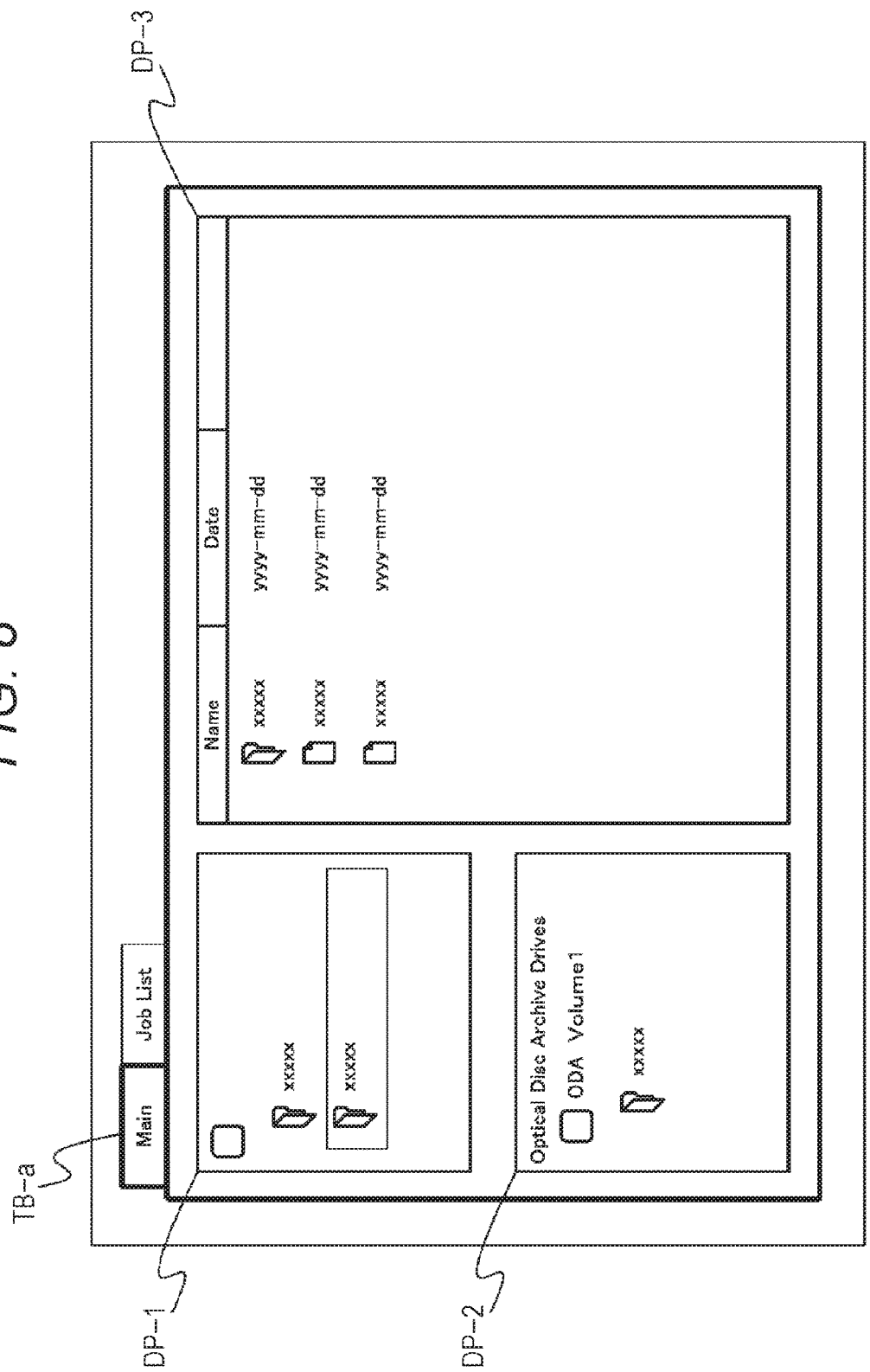
FIG. 8 is a diagram that illustrates a main operation screen as an example.

FIG. 8 illustrates a main operation screen as an example. When a tab TB-a of "Main" on the operation screen is selected, the control unit 50 displays a management screen representing the storage state of information, for example, a main screen representing cartridges of the drive unit 40 or folders and files stored in the control unit 50. In a display area DP-1 of the main screen, for example, a list of folders stored in a volume of the control unit 50 is displayed in a tree pattern. In a display area DP-2, for example, a list of folders stored in a volume (ODA Volume 1) of a cartridge mounted in the drive unit 40, for example, by using a cartridge as one volume is displayed in a tree pattern. In a display area DP-3, a list of folders and files included in a volume or a folder selected in the display area DP-1 or the display area DP-2 is displayed together with attributes. Incidentally, in FIG. 8, a case is illustrated as an example in which a name and date are displayed as an attribute.

Here, in a case where archiving or retrieval of a file is performed, a user selects a volume or a folder in which a file (or a folder) that is a transmission target is stored in the display area DP-1 or the display area DP-2 and displays the file (or the folder) that is the transmission target in the display area DP-3. In addition, the user selects a file (or a folder) that is a transmission target displayed in the display area DP-3 and performs drag & drop of the selected file into a volume or a folder, which is a transmission destination, in the display area DP-1 or the display area DP-2.

Figure 9:
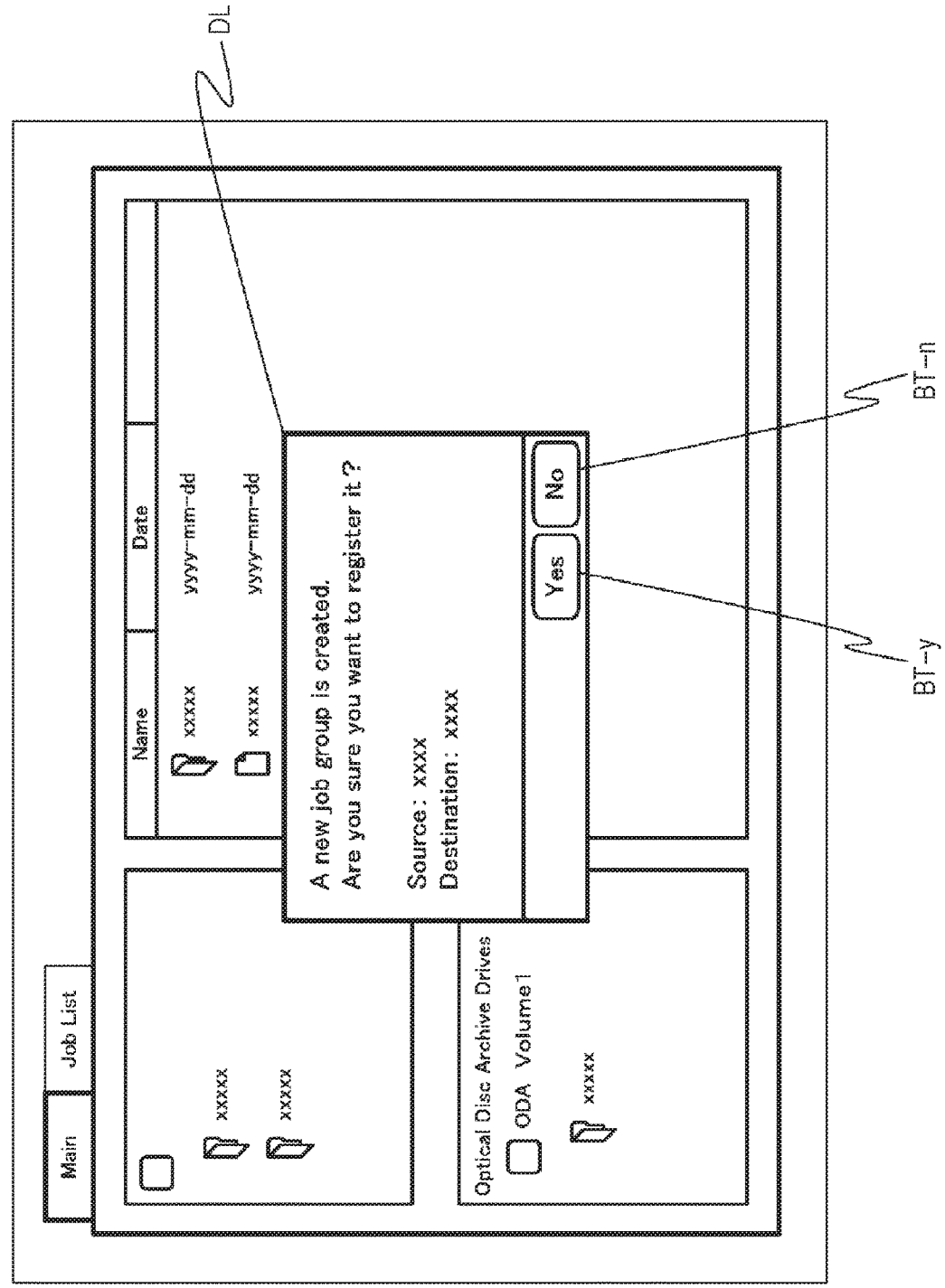
FIG. 9 is a diagram that illustrates a registration checking dialog as an example.

When the drag & drop operation is performed, the control unit 50 displays a registration checking dialog DL illustrated in FIG. 9. In the registration checking dialog, a transmission source and a transmission destination directed according to the drag & drop operation are clearly displayed. In a case where a "Yes" button BT-y is operated by the user, the control unit 50 adds the job group of the transmission directed according to the drag & drop operation. On the other hand, in a case where a "No" button BT-n is operated by the user, the control unit 50 invalidates the drag & drop operation. In this way, the user adds the job group. Incidentally, the addition of the job group is not limited to the drag & drop operation but may be performed by a copy operation, a cut & paste operation, or the like.

Figure 10:
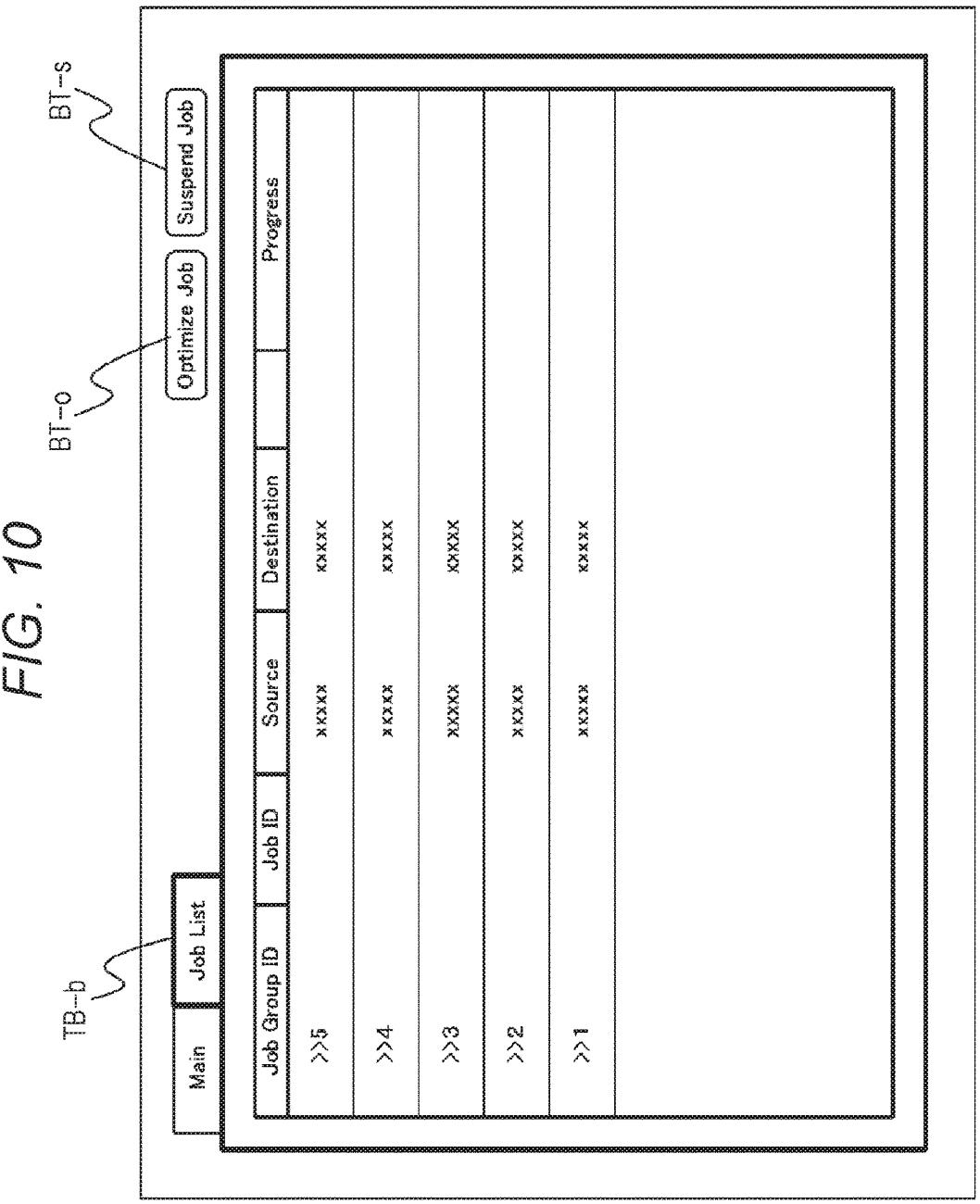
FIG. 10 is a diagram that illustrates a job list screen as an example.

FIG. 10 illustrates a job list screen as an example. When a tab of "Job List" TB-b is selected on the operation screen, the control unit 50 displays a job list screen representing job groups added by the operation as described above. On the job list screen, a job group ID, a job ID, a transmission source (Source), a transmission destination (Destination), a job progress status (Progress) can be displayed. Incidentally, the job group ID is group-specific identification information assigned to each job group, and the job ID is job-specific identification information assigned to each job arranged inside a job group. In addition, on the job list screen, an "Optimise Job" button BT-o used for causing the control unit 50 to perform the automatic optimization process and a "Suspend Job" button BT-s used for stopping the process are arranged. In a case where the automatic optimization process of job groups is performed, after stopping the process by operating the "Suspend Job" button BT-s, the user operates the "Optimise Job" button BT-o. The control unit 50 stops the process in accordance with an operation of the "Suspend Job" button BT-s and performs the automatic optimization process for job groups having job group IDs of "1" to "5" in accordance with an operation of the "Optimise Job" button BT-o. Incidentally, on the list screens illustrated in FIGS. 10 to 14, the process is started from a job group or a job disposed on the lowermost stage, and a job group or a job is executed in order of a direction from the lowermost stage to the uppermost stage.

Figure 11:
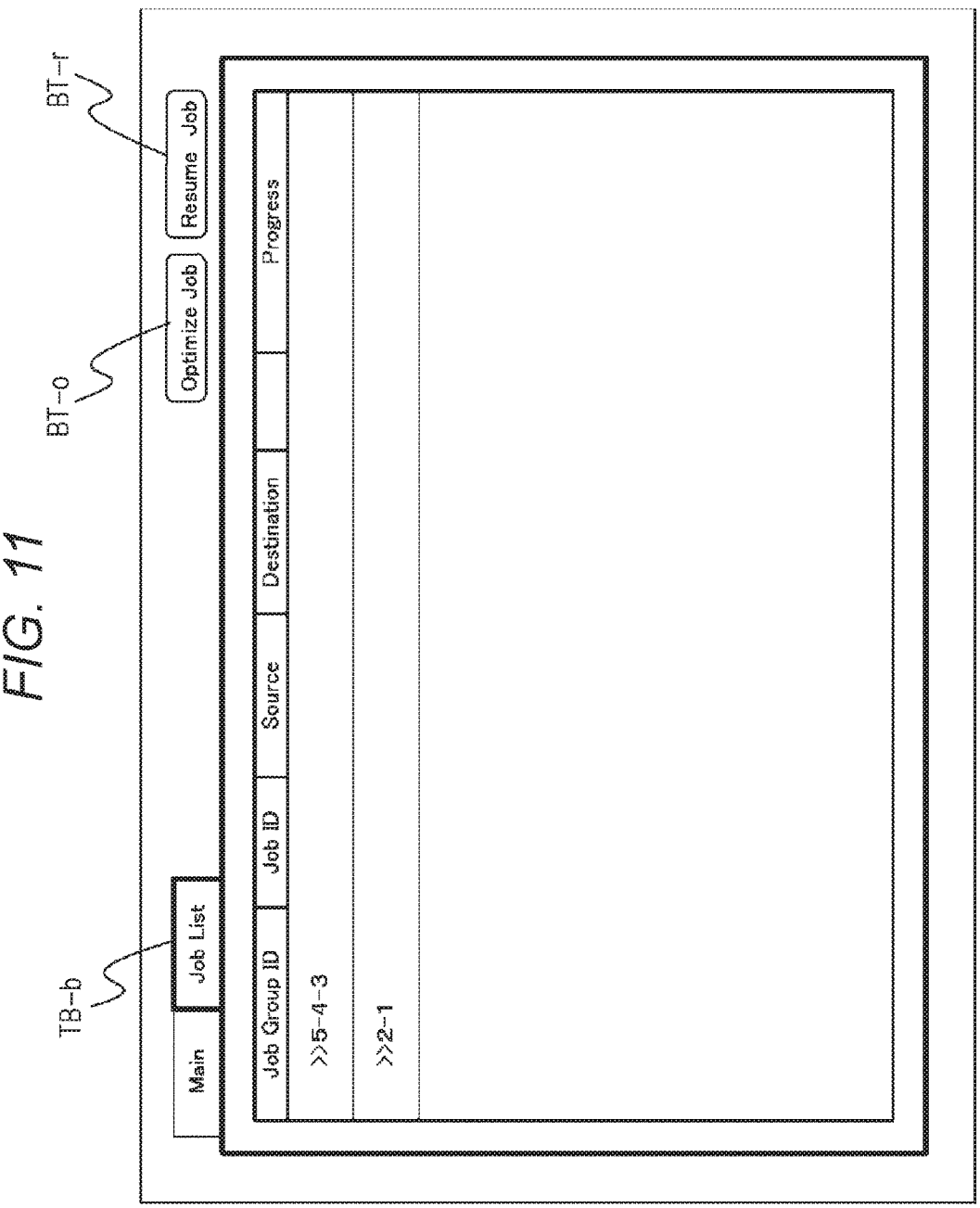
FIG. 11 is a diagram that illustrates a job list screen after an automatic optimization process as an example.

FIG. 11 illustrates a job list screen after the automatic optimization process as an example. In the automatic optimization process, in a case where an optical disc used in one job group is used in the other job group, the job groups are combined. For this reason, in a case where a disc used in a job group having a job group ID="1" is used in a job group having a job group ID="2", the job groups are combined. Incidentally, a job group ID of a job group after the combination is set as "2-1". Similarly, in job groups having job group IDs="3" to "5", in a case where a disc is common among mutually-different job groups, the job groups are combined. Incidentally, a job group ID of a job group after the combination is set as "5-4-3".

In addition, after the automatic optimization process, instead of the "Suspend Job" button BT-s, a "Resume Job" button BT-r used for resuming the process is displayed.

Figure 12:
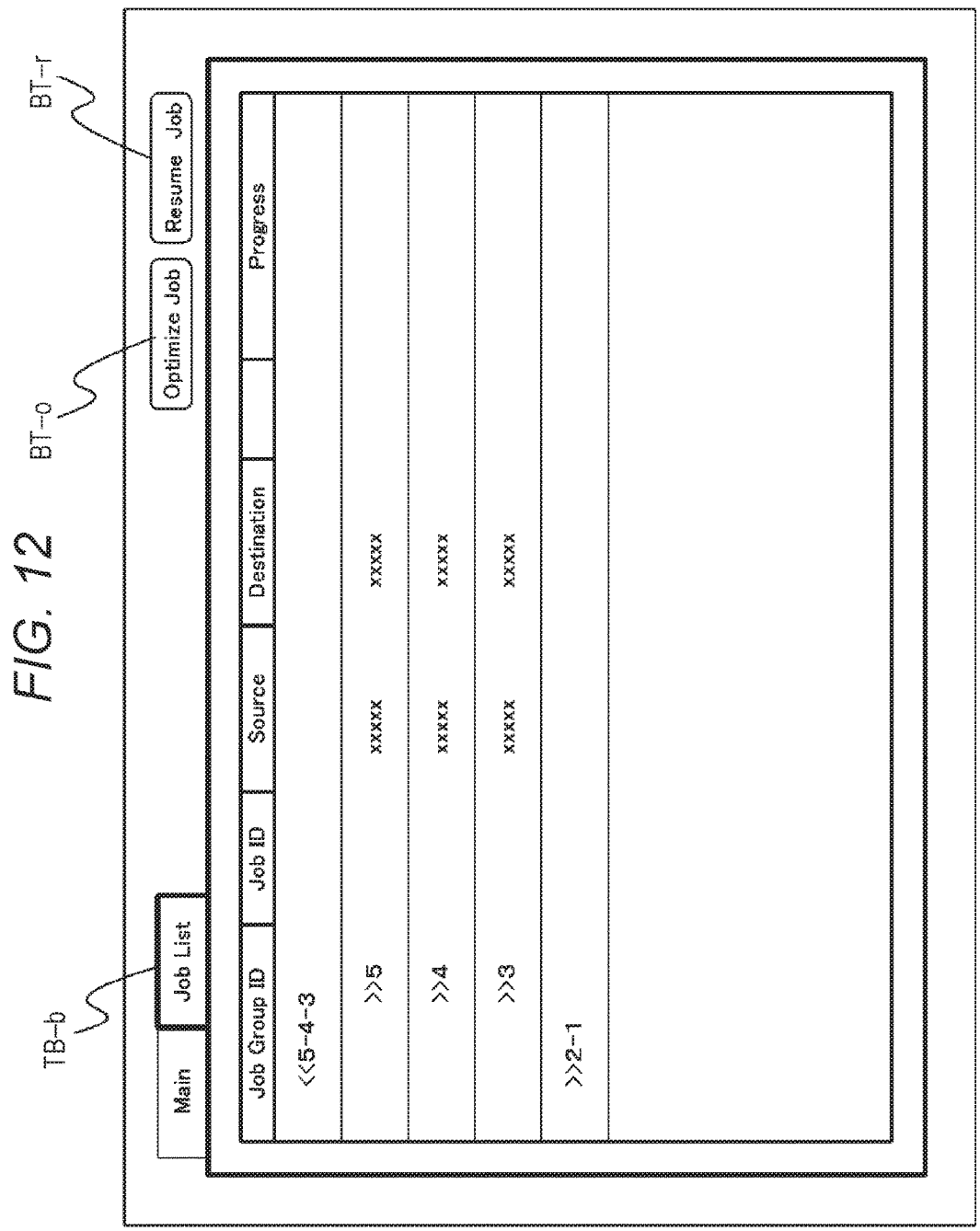
FIG. 12 is a diagram that illustrates a list screen on which job groups after an automatic optimization process are expanded as an example.

FIG. 12 illustrates a list screen on which job groups after the automatic optimization process are expanded as an example. In a case where an operation of selecting a job group ID is performed by a user or the like, the control unit 50 expands job groups of the job group ID. Here, in a case where the selected job group ID is the job group ID="5-4-3" that represents the job group after the combination process, the combined job groups are individually displayed. Accordingly, the user can easily check job groups that are combined. Incidentally, on the list screen, job groups are displayed such that a job group that is not expanded and a job group that is currently expanded can be determined. For example, a mark of "<<" is arranged at the head of a job group ID for the job group that is currently expanded so as to be distinguishable from a job group that is not expanded for which a mark of ">>" is arranged at the head of the job group ID.

FIG. 13 illustrates a list screen on which jobs included in a job group are expanded to be displayed as an example. In a case where an operation of selecting a job group ID is performed by a user or the like, the control unit 50 expands a job group of the job group ID. Here, in a case where the selected job group ID is the job group ID="5" that is expanded in FIG. 12, the control unit 50 displays a job ID, a transmission source, and a transmission destination of each job included in the job group of the job group ID="5". In addition, the control unit 50 displays the completion or the progress status of the job (Progress) in the display field of the progress status (Progress) of the job. Incidentally, when the process of a job is started as the "Resume Job" button BT-r is operated by a user or the like, the control unit 50 sequentially updates the display of the progress status (Progress) in accordance with the progress status of the job.

Figure 14A:
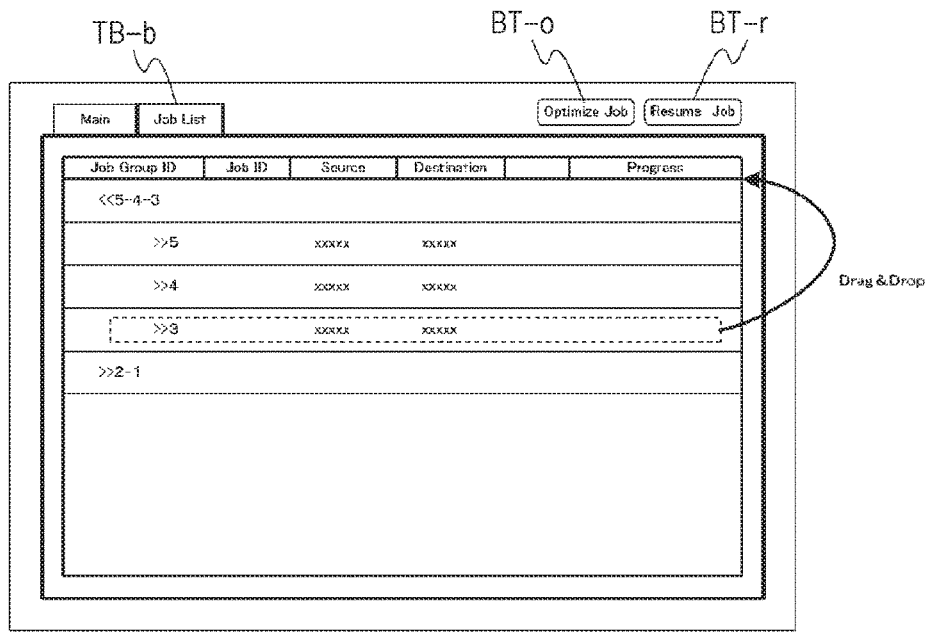
FIGS. 14A and 14B are a diagram that illustrates a priority sequence changing operation using a list screen.
Figure 14B:
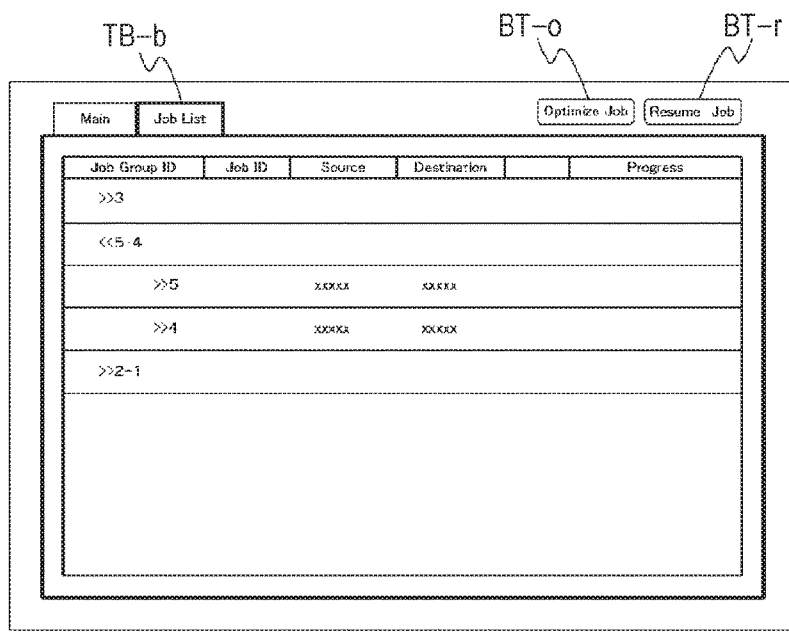

FIGS. 14A and 14B are a diagram that illustrates a priority sequence changing operation using a list screen. Incidentally, FIG. 14A illustrates a list screen before a changing operation as an example, and FIG. 14B illustrates a list screen after the changing operation as an example.

For example, in a case where the priority sequence of a job group corresponding to a job group ID="3" is changed to be executed at last, a drag & drop operation of moving the job group ID="3" to the upper stage of the job group ID="5-4-3" on the list screen is performed. The control unit 50 separates a job group of the job group ID="3" from a job group of the job group ID="5-4-3" on the basis of this operation and sets the remaining job groups for which the combination process is performed as a job group ID="5-4". In addition, the control unit 50 changes the sequence such that the process of the job group of the job group ID="3" is performed after the job group of the job group ID="5-4".

As above, job groups of archiving and retrieval are divided into groups by the automatic optimization process, and the combination process of combining job groups of retrieval is performed, whereby the number of times of disc replacement is decreased to be less than that of a case where the automatic optimization process is not performed. In addition, since the number of times of disc replacement is decreased, archiving and retrieval can be efficiently performed, and the consumption of a cartridge in which a recording medium is housed and the consumption of a mechanism performing conveyance of a cartridge or an optical disc or the like can be reduced. Furthermore, since the consumption can be reduced, the cost for the maintenance and the management can be reduced. In addition, by decreasing the number of times of disc replacement, a time required for the process of archiving or retrieval can be decreased, and accordingly, the power consumption can be reduced by setting the power of the drive unit and the like to be in the Off state after the completion of the process.

In addition, also in a case where the automatic optimization process is performed, the priority sequence of a job group can be changed, and archiving or retrieval that is extremely efficient can be performed in consideration of the sequence desired by the user.

[2-2. Operation Performed in Case of Plurality of Drives]

Next, the operation performed in a case where a plurality of drives (optical disc drives) are used by the drive unit 40 will be described. In the case of the plurality of drives, a list of jobs is generated for each drive, and the automatic optimization process is performed for the list of each drive.

Figure 15:
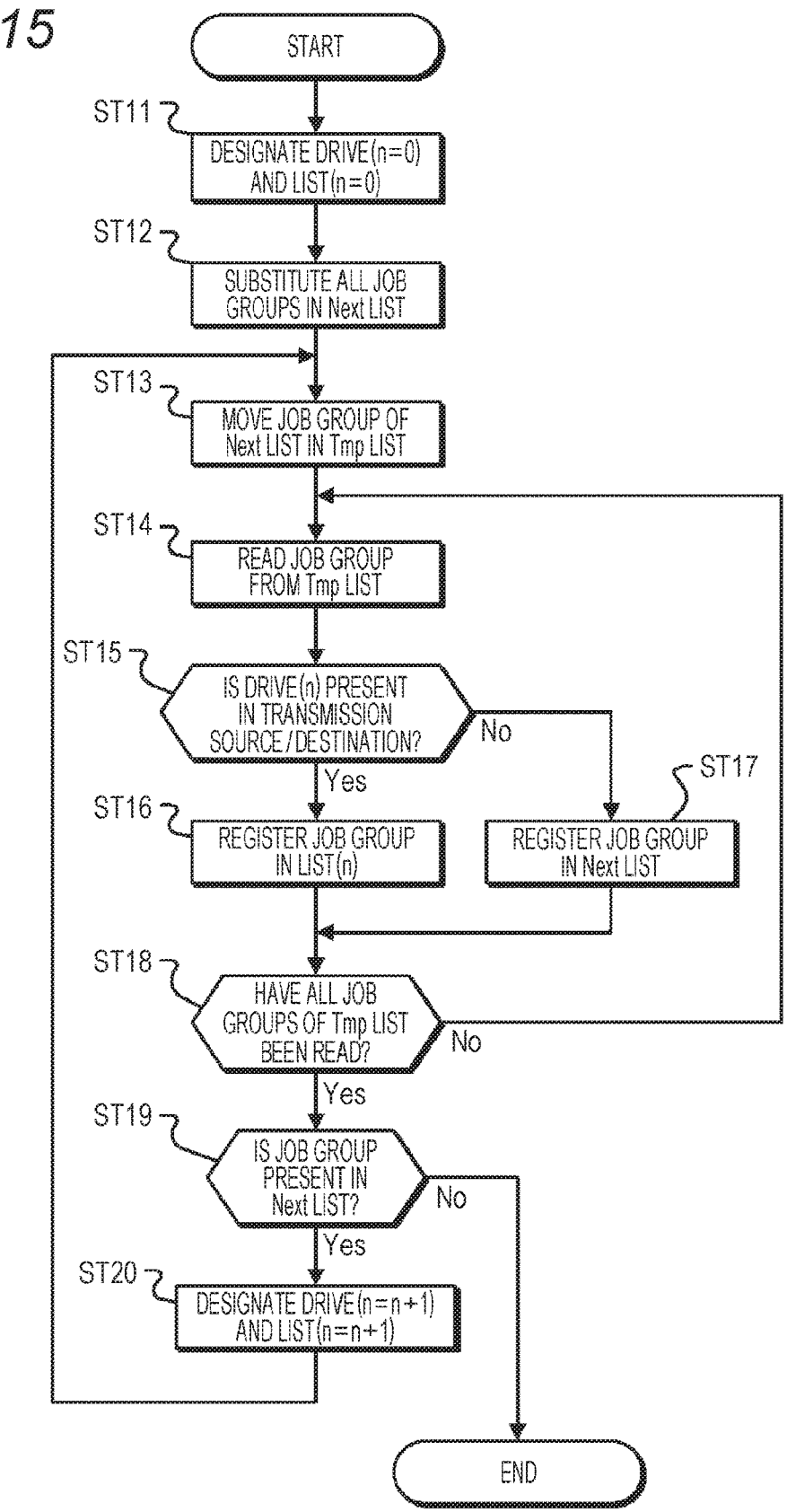
FIG. 15 is a flowchart that illustrates a list generating process for each drive.

FIG. 15 is a flowchart that illustrates a process of generating a list for each drive. In Step ST11, the control unit 50 designates a drive (n=0) and a list (n=0). The control unit 50 designates a first drive and a list corresponding to this drive by setting a variable n representing a drive and a list as "n=0" and proceeds to Step ST12.

In Step ST12, the control unit 50 substitutes all the job groups into a Next list. The control unit 50 substitutes all the job groups into the Next list in which job groups not distributed to a list corresponding to a drive are stored and proceeds to Step ST13.

In Step ST13, the control unit 50 moves job groups of the Next list to a Tmp list. The control unit 50 moves job groups of the Next list to the Tmp list in which job groups distributed to a list corresponding to a drive are stored. In other words, the control unit 50 sets all the job groups not distributed to a list corresponding to a drive as job groups that are distribution process targets and proceeds to Step ST14. Incidentally, when the process of Step ST13 is performed, all the job groups that are not distributed are set as job groups that are distribution process targets, and a state is formed in which any job group is not included in the Next list.

In Step ST14, the control unit 50 reads job groups from the Tmp list. The control unit 50 reads one job group as a job group for which the distribution process is performed from the Tmp list and proceeds to Step ST15.

In Step ST15, the control unit 50 determines whether a drive (n) is present in the transmission source or the transmission destination. The control unit 50 proceeds to Step ST16 in a case where the drive (n) is present in the transmission source or the transmission destination of the job group and proceeds to Step ST17 in a case where the drive (n) is not present in the transmission source and the transmission destination.

In Step ST16, the control unit 50 adds the job group to a list (n). Since the drive (n) is present in the transmission source or the transmission destination of the job group, the control unit 50 adds the job group to the list (n) corresponding to the drive (n) and proceeds to Step ST18.

In Step ST17, the control unit 50 adds the job group to the Next list. Since any drive (n) is not present in the transmission source and the transmission destination of the job group, the control unit 50 determines that the read job group is a job group not distributed to the list corresponding to the drive, registers the job group in the Next list, and proceeds to Step ST18.

In Step ST18, the control unit 50 determines whether all the job groups of the Tmp list have been read. In a case where job groups that have not been read are present in the Tmp list, the control unit 50 causes the process to be returned to Step ST14, reads one job group as a new job group from the job groups that have not been read, and repeats the process described above. On the other hand, in a case where all the job groups of the Tmp list have been read, the control unit 50 proceeds to Step ST19.

In Step ST19, the control unit 50 determines whether a job group is present in the Next list. In a case where a job group is present in the Next list, the control unit 50 proceeds to Step ST20. On the other hand, in a case where a job group is not present in the Next list, in other words, in a case where all the job groups have been added to lists corresponding to certain drives, the control unit 50 ends the list generating process.

In Step ST20, the control unit 50 designates a drive (n=n+1) and a list (n=n+1). Since a job group is present in the Next list, the control unit 50 designates a next drive (n=n+1) and the list (n=n+1) corresponding to the drive such that the process of determining whether the job group can be added to a list corresponding to the next drive can be performed and causes the process to be returned to Step ST13.

By performing the process as described above, all the job groups are added to lists corresponding to certain drives.

Figure 16:
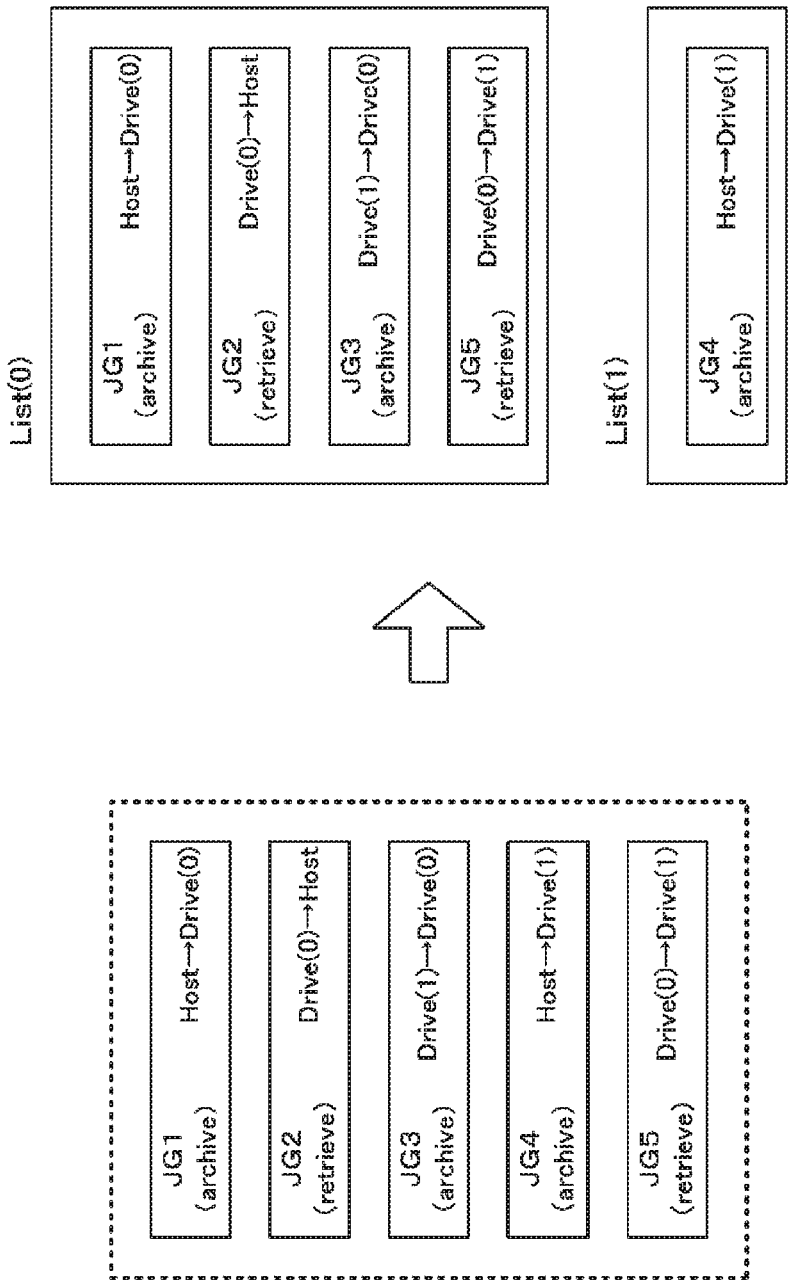
FIGS. 16A and 16B are a diagram that illustrates a process result of the list generating process for each drive as an example.

FIGS. 16A and 16B illustrates a process result of the list generating process for each drive as an example. Incidentally, FIG. 16A illustrates job groups before the process as an example, and FIG. 16B illustrates a list generated for each drive as an example.

A job group JG1 is a job group of archiving and stores files and folders (hereinafter, referred to as "files and the like") of a host (for example, the control unit 50) in a drive (0). A job group JG2 is a job group of retrieval and stores files and the like of the drive (0) in the host. A job group JG3 is a job group of archiving and stores files and the like of a drive (1) in the drive (0). A job group JG4 is a job group of archiving and stores files and the like of the host in the drive (1). A job group JG5 is a job group of retrieval and stores files and the like of the drive (0) in the drive (1).

When the list generating process is performed for the job group JG1 to the job group JG5, the drive (0) is present in the transmission source or the transmission destination in the job groups JG1, JG2, JG3, and JG5, and accordingly, the job groups JG1, JG2, JG3, and JG5 are registered in the list (0). Meanwhile, in the job group JG4, not the drive (0) but the drive (1) is included in the transmission destination or the transmission source. Accordingly, the job group JG4 is registered in the list (1).

Figure 17:
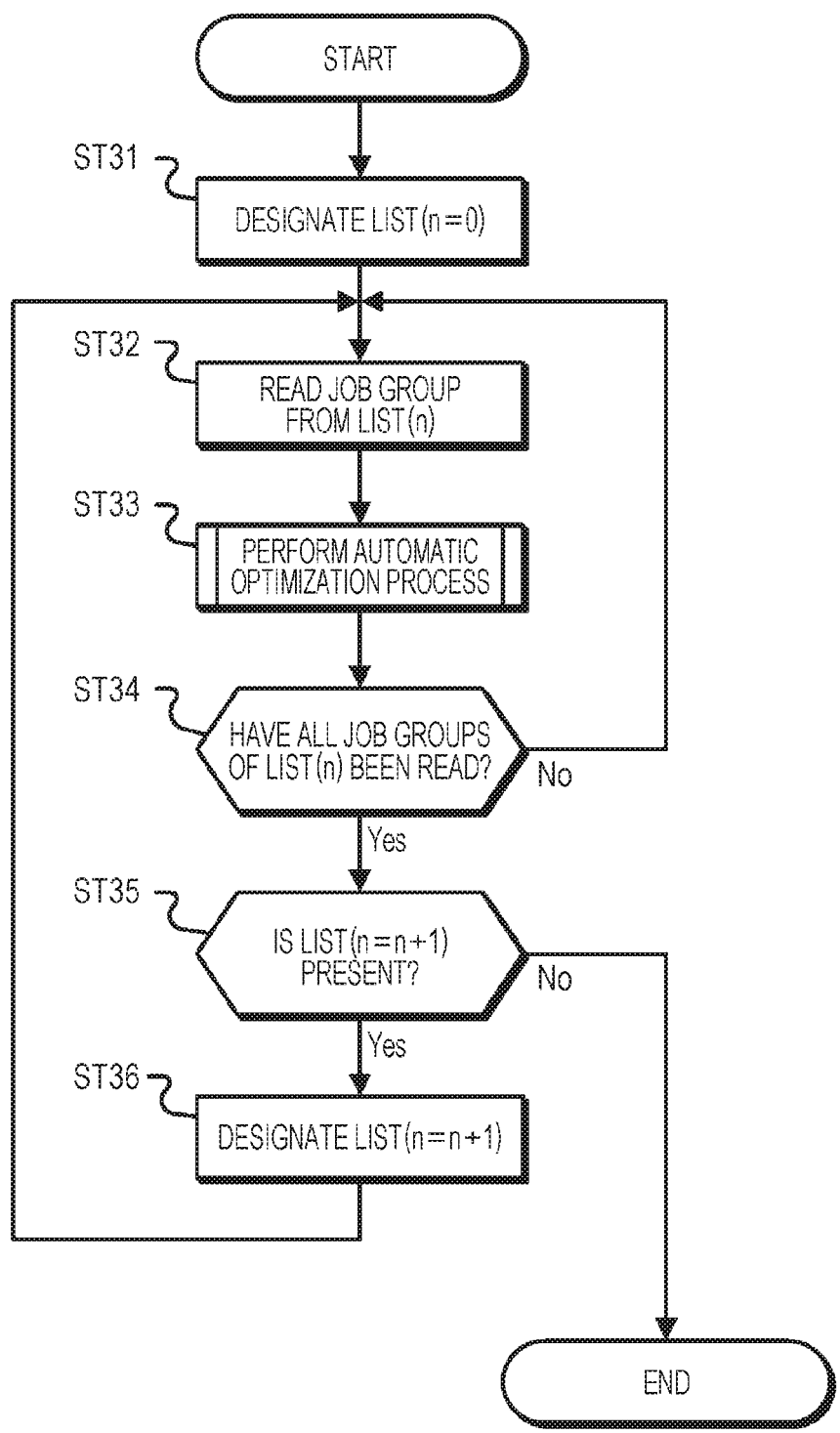
FIG. 17 is a flowchart that illustrates an automatic optimization process for each list.

FIG. 17 is a flowchart that illustrates an automatic optimization process for each list. In Step ST31, the control unit 50 designates a list (n=0). The control unit 50 sets the variable n representing the list as n=0 such that the automatic optimization process of the first list is performed and proceeds to Step ST32.

In Step ST32, the control unit 50 reads job groups from the list (n). The control unit 50 reads the job groups from the list (n) and proceeds to Step ST33 with the read job groups set as job groups of additional handling.

In Step ST33, the control unit 50 performs an automatic optimization process. The control unit 50 performs the automatic optimization process illustrated in FIG. 3 and proceeds to Step ST34.

In Step ST34, the control unit 50 determines whether all the job groups of the list (n) have been read. In a case where a job group that has not been read is present in the list (n), the control unit 50 causes the process to be returned to Step ST32, reads one job group as a new job group from the job groups that have not been read, and repeats the process described above. On the other hand, in a case where all the job groups of the list (n) have been read, the control unit 50 proceeds to Step ST35.

In Step ST35, the control unit 50 determines whether a list (n=n+1) is present. In a case where the list (n=n+1) is generated, the control unit 50 proceeds to Step ST36. On the other hand, in a case where the list (n=n+1) is not generated, in other words, in a case where the process for a list including the job group is completed, the control unit 50 ends the automatic optimization process for each list.

In Step ST36, the control unit 50 designates a list (n=n+1). The control unit 50 designates a list for which the automatic optimization process is performed next as the list (n=n+1) and causes the process to be returned to Step ST32.

Figures 18A, 18B:
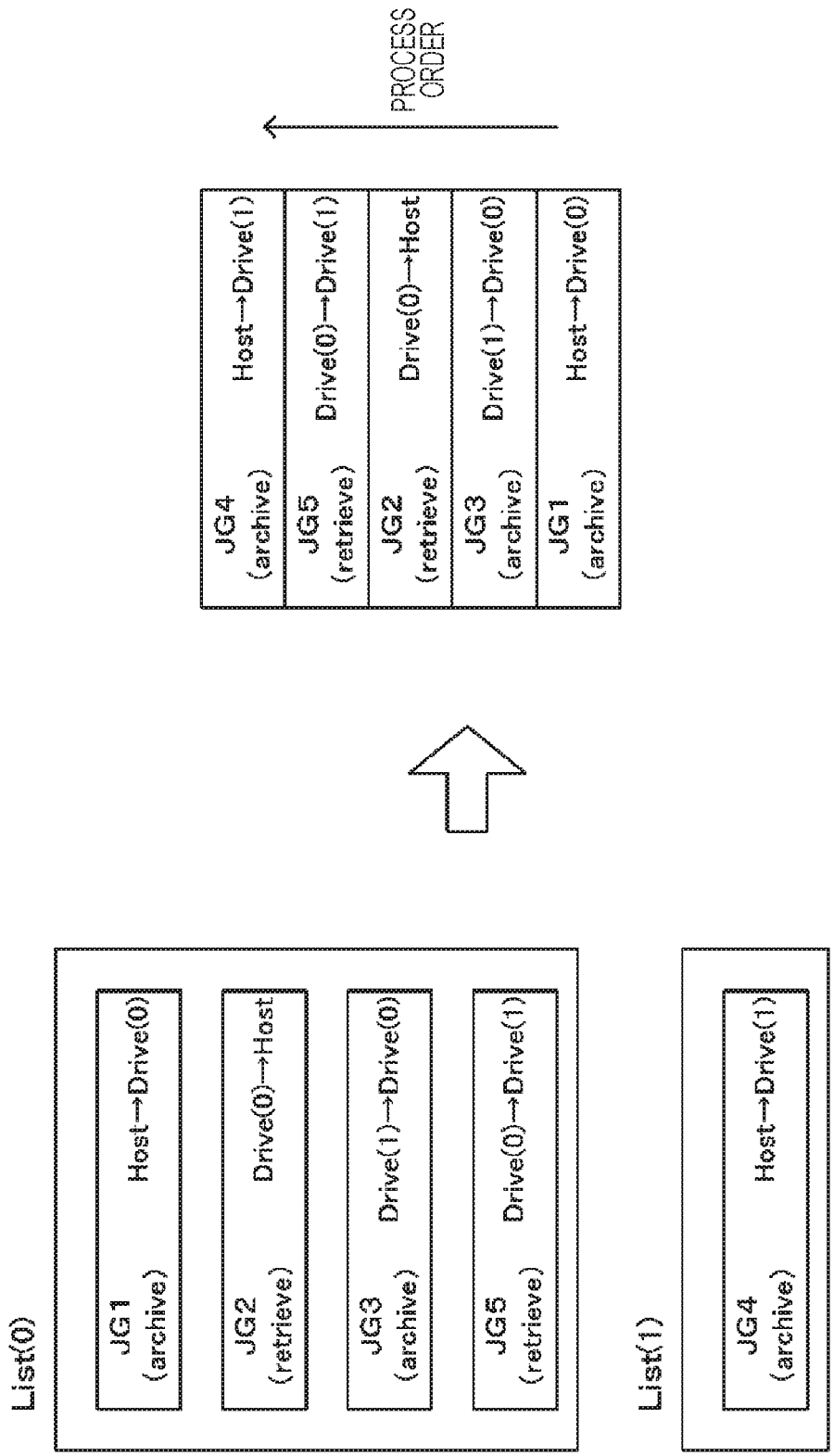
FIGS. 18A and 18B are a diagram that illustrates a list before an automatic optimization process and a list after the automatic optimization process as an example.

FIGS. 18A and 18B illustrates a list before an automatic optimization process and a list after the automatic optimization process as an example. Incidentally, FIG. 18A illustrates a list before the automatic optimization process, and FIG. 18B illustrates a list after the automatic optimization process.

In the list (0) before the automatic optimization process, as described above, the job groups JG1, JG2, JG3, and JG5 are registered, and, in the list (1) before the automatic optimization process, the job group JG4 is registered.

Here, in a case where the automatic optimization process is performed for the job groups of the list (0), the job groups of the list (0) are divided into job groups of archiving and job groups of retrieval. In addition, in the job groups of retrieval, the combination process for combining jobs is performed depending on the use status of discs. Accordingly, after the automatic optimization process, the job group JG3 of archiving is executed after the job group JG1 of archiving, and, thereafter, the job groups JG2 and JG5 of retrieval are executed. In addition, in the job groups JG2 and JG4, in a case where there is a disc that is commonly used among discs of the drive (0) used in the job, a combination process is performed for the job group JG2 and the job group JG4 such that jobs using the common disc are continuously performed.

Incidentally, the job group JG4 of the list (1), for example, may be configured to be executed after the completion of the job groups of the list (0) or be executed before the job groups of the list (0).

Furthermore, during the execution of a job group, the control unit 50 may perform disc replacement enabling an optical disc, which is used in a job group executed thereafter, to be used by a drive other than the currently-used drive. In other words, the control unit 50 conceals a time lag by causing disc replacement to another drive not blocking data transmission to occur.

Figures 19A, 19B:
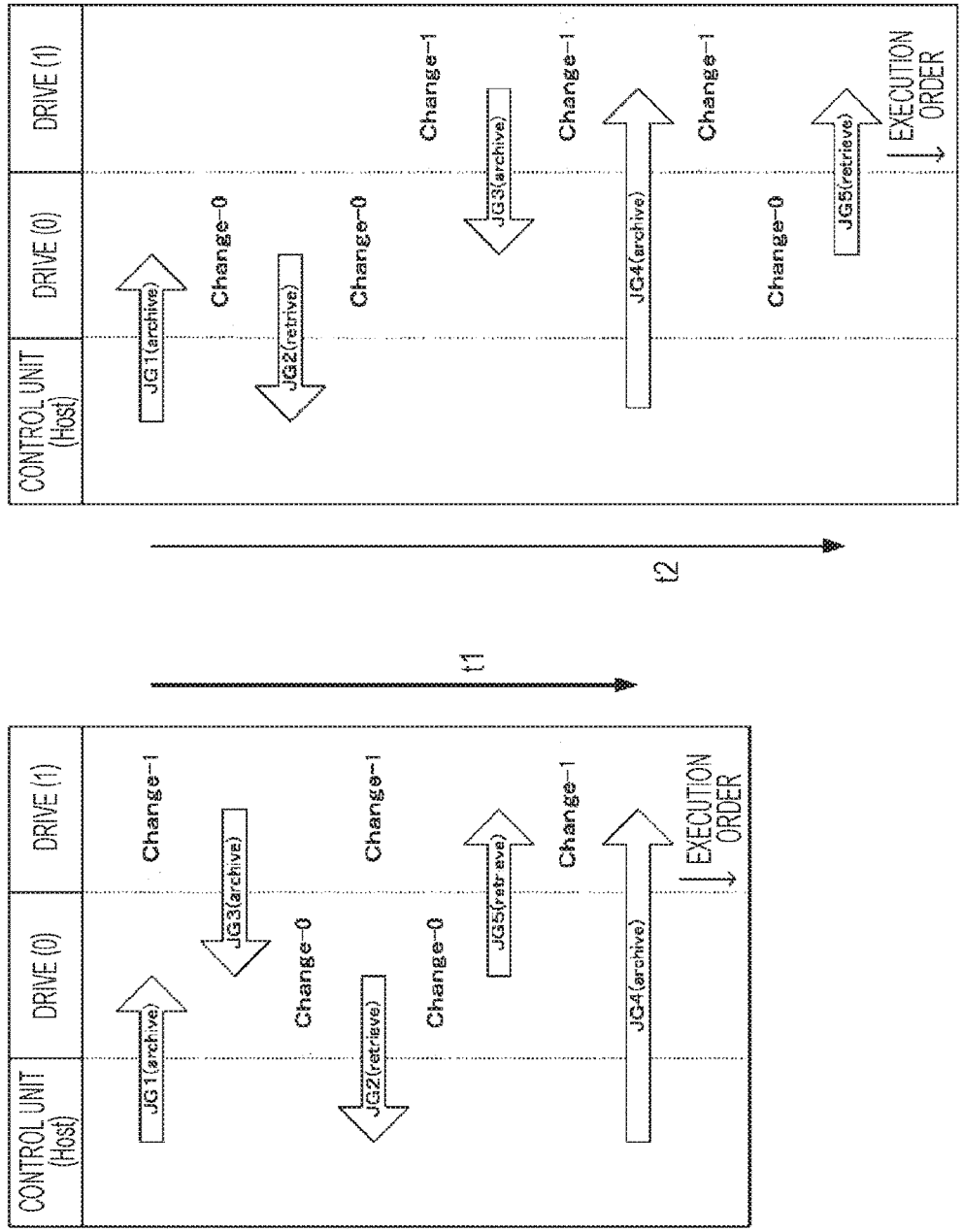
FIGS. 19A and 19B are a diagram that illustrates an operation of a case where a disc replacement to a drive other than a currently-used drive is performed in the middle of execution of a job group after the automatic optimization process as an example.

FIGS. 19A and 19B illustrates an operation of a case where a disc replacement to a drive other than a currently-used drive is performed in the middle of execution of a job group after the automatic optimization process as an example. Incidentally, FIG. 19A illustrates an operation of a case where disc replacement to a drive other than a currently-used drive is performed in the middle of execution of a job group. In addition, FIG. 19B illustrates a case as an example in which the automatic optimization process and disc replacement in the middle of the execution of a job group are not performed.

As illustrated in FIG. 19A, in the middle of the execution of the job group JG1, a drive (1) is not used. Accordingly, the control unit 50 performs replacement to a disc on which data read by the job group JG3 is recorded by using the drive (1). In addition, the job group JG1 and the job group JG3 are job groups of archiving, and, in the drive (0) that is the transmission destination of data, disc replacement is unnecessary. Accordingly, after the completion of the job group JG1, the job group JG3 can be started in a speedy manner.

In addition, in the middle of the execution of the job group JG2, the drive (1) is not used. Accordingly, the control unit 50 performs replacement to a disc used for writing data by the job group JG5 by using the drive (1). Thereafter, by performing disc replacement from the job group JG2 to the job group JG5 by using the drive (0), the job group JG5 can be started.

In addition, after the completion of the job group JG5, disc replacement for recording data of the job group JG4 of archiving is performed by using the drive (1), and the job group JG4 is started after the disc replacement.

Incidentally, in a case where the job group JG2 and the job group JG5 are combined, the number of times of disc replacement is less than that of a case where the job group JG2 and the job group JG5 are independently performed, and a time required from the start of the job group JG2 to the completion of the job group JG5 is further shortened.

In a case where the automatic optimization process and the disc replacement during the execution of a job group are not performed, as illustrated in FIG. 19B, when the job group JG1 of archiving is completed, the job group JG2 of retrieval is executed. For this reason, in the drive (0), disc replacement from a disc on which data is recorded to a disc on which data read by the job group JG2 is recorded is performed. In addition, when the job group JG2 is completed, in the drive (0), disc replacement from a disc from which data has been read to a disc on which data is recorded by the job group JG3 of archiving is performed. Furthermore, in the drive (1), disc replacement to a disc on which data read by the job group JG3 that is a job group of archiving is recorded is performed. When the job group JG3 is completed, in the drive (1), disc replacement to a disc on which data is recorded by the job group JG4 that is a job group of archiving is performed. When the job group JG4 is completed, in the drive (1), disc replacement to a disc on which data is recorded by the job group JG5 of retrieval is performed. In addition, in the drive (0), disc replacement to a disc on which data read by the job group JG5 is recorded is performed. In this way, in a case where the automatic optimization process and the disc replacement during the execution of the job group are not performed, reduction of the number of times of disc replacement and concealment of a time lag according to disc replacement using the execution time of a job group are not performed.

According to the present technology, in the middle of execution of a job group, by using a recording media drive other than a currently-used recording media drive, a recording medium used in a job executed thereafter is prepared to be usable for another recording media drive. In other words, by performing disc replacement by using the execution time of a job group, the total processing time can be shortened by concealing a time lag. For example, in the case illustrated in FIGS. 19A and 19B, the automatic optimization process is performed, and a time lag is concealed by performing disc replacement using the execution time of the job group, whereby a total processing time can be shortened from "t2" to "t1".

As above, also in a case where a plurality of drives are used, job groups are distributed to each drive, and division of job groups of archiving and job groups of retrieval into groups and the combination process of job groups in the retrieval are performed for each drive. Accordingly, the number of times of disc replacement is decreased to be less than that of a case where the automatic optimization process is not performed, and archiving and retrieval can be efficiently performed. In addition, since the number of times of disc replacement is reduced, the consumption of a cartridge and the consumption of a mechanism can be reduced, and the cost for the maintenance and management can be reduced. Furthermore, the number of times of switching between drives may be small. In addition, since the number of times of switching between drives and disc replacement can be decreased, a time required for the process of archiving and retrieval can be decreased. Furthermore, also in a case where the automatic optimization process is performed, the priority sequence of a job group can be changed, and archiving and retrieval that are extremely efficient in consideration of the sequence desired by the user can be performed.

In addition, disc replacement to a recording media drive other than the currently-used recording media drive is performed, and a recording medium that is used in a job to be executed thereafter is prepared in the middle of execution of the job group. In such a case, the time lag is concealed without blocking the data transmission, and a total processing time can be shortened.

In addition, in the embodiment described above, a case has been described in which data is sequentially recorded over a plurality of optical discs. However, the recording of data is not limited to the sequential recording but may be random recording. The recording medium is not limited to an optical disc and, for example, may be a recording medium such as a magnetic tape or a semiconductor memory card using a different shape or a different material. In addition, the replacement of a recording medium is not limited to replacement between recording media disposed inside a cartridge, but, also in a case where an individual recording medium that is independently arranged is replaced, in a case where data is recorded over a plurality of cartridges, the replacement of a cartridge is included in the replacement of a recording medium. Furthermore, information recorded on a recording medium is not limited to data of a video, an audio, or the like but may be other various kinds of data.

In addition, a series of the processes described in the specification can be executed by hardware, software, or a combined configuration of both the hardware and software. In a case where the process is executed by software, a program recording a processing sequence can be installed to a memory arranged inside a computer built in dedicated hardware and executed, or the program can be installed to a general-purpose computer that can execute various processes and be executed.

For example, the program may be recorded in a hard disk, a solid state drive (SSD), or a read only memory (ROM) as a recording medium in advance. Alternatively, the program may be temporarily or permanently stored (recorded) in a removable recording medium such as a flexible disc, a compact disc read only memory (CD-ROM), a magneto optical (MO) disc, a digital versatile disc (DVD), a Blu-ray disc (BD; registered trademark), a magnetic disk, or a semiconductor memory card. Such a removable recording medium can be provided as so-called package software.

In addition to the installation of the program to a computer from a removable recording medium, the program can be transmitted to a computer from a download site through a network such as a local area network (LAN) or the Internet in a wireless or wired manner. The computer may be configured to receive the program transmitted in that way and install the program on a recording medium such as a built-in hard disk.

Incidentally, the effects described in this specification are merely examples, and the effects of the present technology are not limited thereto, but there may be additional effects not described here. In addition, the present technology should not be construed as being limited to the embodiments of the technology described above. The embodiments of the technology disclose the present technology in the form of examples, and it is apparent that the embodiments can be modified or substituted in a range not departing from the concept of the present technology by a person skilled in the art. In other words, in order to determine the concept of the present technology, the claims need to be referred to.

In addition, the information processing device according to the present technology may take configurations as below.

(1) An information processing device including:

a control unit that performs a job of storing information on a recording medium selected from among a plurality of recording media or a job of reading the information from a recording medium on which desired information is stored among the plurality of recording media by controlling a recording media drive, wherein the control unit divides a plurality of the jobs into a group performing storage of the information and a group performing reading of the information and performs a setting process of setting an execution sequence of the jobs in order of the groups and, for the job of reading the information, performs a combination process combining jobs of which recording media of transmission sources or transmission destinations of the information are common.

(2) The information processing device according to (1), wherein the control unit performs the setting process of setting the execution sequence in accordance with addition of the job and, in a case where jobs of which recording media of transmission sources or transmission destinations of the information are common are generated according to the addition of the job, performs the combination process.

(3) The information processing device according to (1) or (2), wherein, in a case where the job of storing the information is added, the control unit sets the job as a job executed last in the group performing storage of the information.

(4) The information processing device according to (3), wherein, in the storing of the information on a recording medium, information is sequentially stored on a recording medium and, in a case where the information cannot be stored, information is sequentially stored on a new recording medium.

(5) The information processing device according to any of (1) to (4), wherein, in a case where there is a plurality of the recording media drives, the control unit performs the setting process of setting the execution sequence and the combination process for each of the recording media drives and performs jobs in order of the recording media drives.

(6) The information processing device according to (5),
wherein the control unit prepares a recording medium used in a job that is subsequently executed in a recording media drive other than a currently-used recording media drive in the middle of execution of a job.

(7) The information processing device according to any of (1) to (6),
wherein the control unit performs display control of a management screen representing a storage state of the information and, in a case where an operation for storing information on the recording medium or reading information stored on the recording medium is performed on the management screen, adds a job according to the operation.

(8) The information processing device according to any of (1) to (7),
wherein the control unit performs display control of a list screen representing a list of the jobs, performs the setting process of setting the execution sequence and the combination process in accordance with a direction on the list screen, and displays a process result.

(9) The information processing device according to any of (1) to (8),
wherein the control unit performs display control of a list screen representing a list of the jobs, displays the jobs to be aligned in an execution sequence on the list screen, and changes the execution sequence in accordance with an operation of moving a job on the list screen.

(10) The information processing device according to any of (1) to (9),
wherein, in the job, one or a plurality of pieces of information are stored or read.

INDUSTRIAL APPLICABILITY

According to an information processing device, an information processing method, and a program of the present technology, in a case where a job of storing information on a recording medium selected from among a plurality of recording media or a job of reading the information from a recording medium on which desired information is stored among the plurality of recording media is performed by controlling a recording media drive, a plurality of the jobs are divided into a group performing storage of the information and a group performing reading of the information, a setting process of setting an execution sequence of the jobs is performed in order of the groups, and, for the job of reading the information, a combination process combining jobs of which recording media of transmission sources or transmission destinations of the information are common is performed. For this reason, archiving and retrieval of information can be efficiently performed using a plurality of recording media. Accordingly, the present technology is appropriate to a system that performs archiving or retrieval, for example, of a video content by using an optical disc or the like.

REFERENCE SIGNS LIST

10 Information processing device
20 Cartridge housing unit
25 Cartridge
30 Cartridge conveying mechanism
40 Drive unit
50 Control unit
251-1 to 251-12 Optical disc
252 Cartridge memory

The invention claimed is:

1. An information processing device, comprising:
a control unit configured to:
control execution of a storing operation corresponding to storage of first information on a first recording medium of a plurality of recording media drives,
wherein the first information corresponds to a first job of a plurality of jobs, and
wherein the first job is of a first job type corresponding to the storing operation;
control execution of a reading operation to read second information from a second recording medium of the plurality of recording media drives,
wherein the second information is stored on the second recording medium,
wherein the second information corresponds to a second job of the plurality of jobs, and
wherein the second job is of a second job type corresponding to the reading operation;
divide the plurality of the jobs into a first group that performs storage of the first information and a second group that performs retrieval of the second information;
set a first execution sequence of the plurality of jobs based on the first group and the second group;
combine a plurality of first jobs corresponding to the reading operation, wherein at least one of a first transmission source or a first transmission destination of the first information is same for the plurality of first jobs;
execute one of the storing operation or the reading operation based on the set first execution sequence for the plurality of jobs, wherein the one of the storing operation or the reading operation is executed for an execution time period; and
prepare, within the execution time period, a third recording medium of the plurality of recording media drives, based on the execution of the one of the storing operation or the reading operation,
wherein the third recording medium is associated with a third job subsequent to one of the executed first job or the executed second job in the first execution sequence.

2. The information processing device according to claim 1,
wherein the control unit is further configured to:
add a fourth job corresponding to one of the first job type or the second job type; and
combine the added fourth job with a corresponding one of the plurality of first jobs or a plurality of second jobs corresponding to the storing operation,
wherein at least one of a second transmission source or a second transmission destination of the second information is same for the added fourth job and the corresponding one of the plurality of first jobs or the plurality of second jobs; and
update the set first execution sequence based on the added fourth job.

3. The information processing device according to claim 1,
wherein the control unit is further configured to:
add a fourth job to the plurality of first jobs, and
set the first execution sequence for the plurality of jobs such that the added fourth job is executed last in the first group that performs storage of the first information.

4. The information processing device according to claim 3,
wherein the control unit is further configured to:
sequentially store the first information on the first recording medium based on the execution of the storing operation and an availability of a free memory block in the first recording medium; and
sequentially store the first information on a fourth recording medium based on the execution of the storing operation and a non-availability of the free memory block in the first recording medium.

5. The information processing device according to claim 1, further comprising:
the plurality of recording media drives,
wherein the control unit is further configured to:
combine a plurality of third jobs of the plurality of recording media drives based on the first job type and the second job type;
set a second execution sequence of the plurality of third jobs of the plurality of recording media drives; and
execute the plurality of third jobs based on the set second execution sequence and an order of the plurality of recording media drives.

6. The information processing device according to claim 1,
wherein the control unit is further configured to:
control a display screen to display a management screen representing a storage state of at least one of the first information or the second information; and
add a fourth job in the first execution sequence based on a user operation for at least one of the storing operation or the reading operation on the displayed management screen.

7. The information processing device according to claim 1,
wherein the control unit is further configured to:
control a display screen to display a list screen representing a list of the plurality of jobs;
set the first execution sequence;
combine at least one of the plurality of first jobs or a plurality of second jobs corresponding to the storing operation based on the list of the plurality of jobs on the displayed list screen; and
control the display screen to display a process result corresponding to combination of the at least one of the plurality of first jobs or the plurality of second jobs.

8. The information processing device according to claim 1,
wherein the control unit is further configured to:
control a display screen to display a list screen representing a list of the plurality of jobs;
control the display screen to display a plurality of third jobs to be aligned in a third execution sequence on the list screen; and
update the third execution sequence based on a user operation to move a job of the plurality of third jobs.

9. An information processing method, comprising:
in an information processing device:
controlling execution of a storing operation corresponding to storage of first information on a first recording medium of a plurality of recording media drives,
wherein the first information corresponds to a first job of a plurality of jobs, and
wherein the first job is of a first job type corresponding to the storing operation;
controlling execution of a reading operation to read second information from a second recording medium of the plurality of recording media drives,
wherein the second information is stored on the second recording medium,
wherein the second information corresponds to a second job of the plurality of jobs, and
wherein the second job is of a second job type corresponding to the reading operation;
dividing the plurality of the jobs into a first group that performs storage of the first information and a second group that performs retrieval of the second information;
setting a first execution sequence of the plurality of jobs based on the first group and the second group;
combining a plurality of first jobs corresponding to the reading operation, wherein at least one of a first transmission source or a first transmission destination of the first information is same for the plurality of first jobs;
executing one of the storing operation or the reading operation based on the set first execution sequence for the plurality of jobs, wherein the one of the storing operation or the reading operation is executed for an execution time period; and
preparing, within the execution time period, a third recording medium of the plurality of recording media drives, based on the execution of the one of the storing operation or the reading operation,
wherein the third recording medium is associated with a third job subsequent to one of the executed first job or the executed second job in the first execution sequence.

10. A non-transitory computer-readable medium having stored thereon, computer-executable instructions which, when executed by a processor, cause the processor to execute operations, the operations comprising:
in an information processing device:
controlling execution of a reading operation to read second information from a second recording medium of a plurality of recording media drives,
wherein the second information is stored on the second recording medium,
wherein the second information corresponds to a second job of a plurality of jobs, and
wherein the second job is of a second job type corresponding to the reading operation;
dividing the plurality of jobs into a first group that performs storage of first information and a second group that performs retrieval of the second information;
setting a first execution sequence of the plurality of jobs based on the first group and the second group;
combining a plurality of first jobs corresponding to the reading operation, wherein at least one of a first transmission source or a first transmission destination of the first information is same for the plurality of first jobs;
executing one of a storing operation or the reading operation based on the set first execution sequence for the plurality of jobs, wherein the one of the storing operation or the reading operation is executed for an execution time period; and
preparing, within the execution time period, a third recording medium of the plurality of recording media drives, based on the execution of the one of the storing operation or the reading operation, wherein the third recording medium is associated with a third job subsequent to one of the executed first job or the executed second job in the first execution sequence.

* * * * *